United States Patent
Nakagawa

(10) Patent No.: US 12,442,423 B2
(45) Date of Patent: Oct. 14, 2025

(54) CAM CLUTCH

(71) Applicant: TSUBAKIMOTO CHAIN CO., Osaka (JP)

(72) Inventor: Eiichi Nakagawa, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 0 days.

(21) Appl. No.: 18/599,989

(22) Filed: Mar. 8, 2024

(65) Prior Publication Data

US 2024/0209903 A1    Jun. 27, 2024

Related U.S. Application Data

(63) Continuation of application No. PCT/JP2022/027054, filed on Jul. 8, 2022.

(30) Foreign Application Priority Data

Oct. 27, 2021 (JP) ................. 2021-175723

(51) Int. Cl.
*F16D 41/08* (2006.01)
*F16D 41/07* (2006.01)

(52) U.S. Cl.
CPC .......... *F16D 41/084* (2013.01); *F16D 41/07* (2013.01)

(58) Field of Classification Search
CPC ............................................. F16D 41/08–088
See application file for complete search history.

(56) References Cited

U.S. PATENT DOCUMENTS 4,360,093 A    11/1982   Wakabayashi et al.
4,635,771 A *  1/1987   Shoji .............. F16D 41/06
                                                      192/56.5

(Continued)

FOREIGN PATENT DOCUMENTS

JP    56-63131 A    5/1981
JP    3-113120 A    5/1991

(Continued)

OTHER PUBLICATIONS

Written Opinion of the International Searching Authority (Form PCT/ISA/237) dated Sep. 20, 2022, issued in counterpart International Application No. PCT/JP2022/027054. (3 pages).

(Continued)

*Primary Examiner* — Ernesto A Suarez
*Assistant Examiner* — Lillian T Nguyen
(74) *Attorney, Agent, or Firm* — WHDA, LLP

(57) ABSTRACT

An object of the present invention is to provide a cam and a one-way cam clutch that realize a reduction in weight and production cost, provide more design freedom in setting the center of gravity of the cam, and achieve high responsiveness. The above object is achieved by a cam configured to make contact with an inner race and an outer race by a rotational moment applied in an engaged direction by an annular spring, in which a plurality of cam plates having an identical outer contour and arranged in parallel along a direction of the pivot axis are coupled together and united by a connecting pin extending in the direction of the pivot axis, and the annular spring is configured to be mountable between adjacent cam plates and/or on an outer side of the plurality of cam plates in the direction of the pivot axis.

16 Claims, 16 Drawing Sheets

(56) References Cited

U.S. PATENT DOCUMENTS

| | | | |
|---|---|---|---|
| 5,285,950 A | | 2/1994 | Zlotek |
| 11,808,313 B2* | | 11/2023 | Kunimatsu ............. F16D 41/08 |
| 2008/0190728 A1* | | 8/2008 | Segawa ................ F16D 41/073 |
| | | | 192/41 A |
| 2013/0319811 A1* | | 12/2013 | Kato ....................... F16D 41/07 |
| | | | 192/45.1 |
| 2014/0326565 A1 | | 11/2014 | Iwano et al. |
| 2022/0056963 A1 | | 2/2022 | Nakagawa et al. |
| 2024/0068529 A1 | | 2/2024 | Nakagawa et al. |

FOREIGN PATENT DOCUMENTS

| | | |
|---|---|---|
| JP | 5-196065 A | 8/1993 |
| JP | 11-182589 A | 7/1999 |
| JP | 2008-106801 A | 5/2008 |
| JP | 2011-220509 A | 11/2011 |
| JP | 2014-219015 A | 11/2014 |
| JP | 2015194194 A | 11/2015 |
| JP | 2017-101786 A | 6/2017 |
| JP | 2020051536 A | 4/2020 |
| JP | 2020190255 A | 11/2020 |
| WO | 2022259736 A1 | 12/2022 |

OTHER PUBLICATIONS

International Search Report dated Sep. 20, 2022, issued in counterpart International Application No. PCT/JP2022/027054, with English Translation. (4 pages).
Extended (Supplementary) European Search Report dated Sep. 5, 2025, issued in counterpart application No. 22886391.6 (8 pages).

* cited by examiner

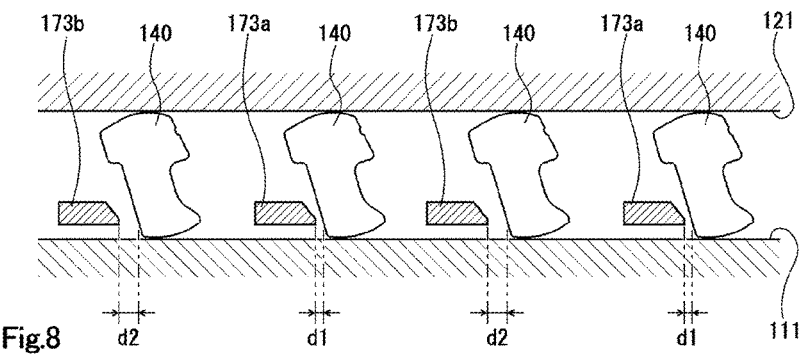
Fig.8
Fig.9
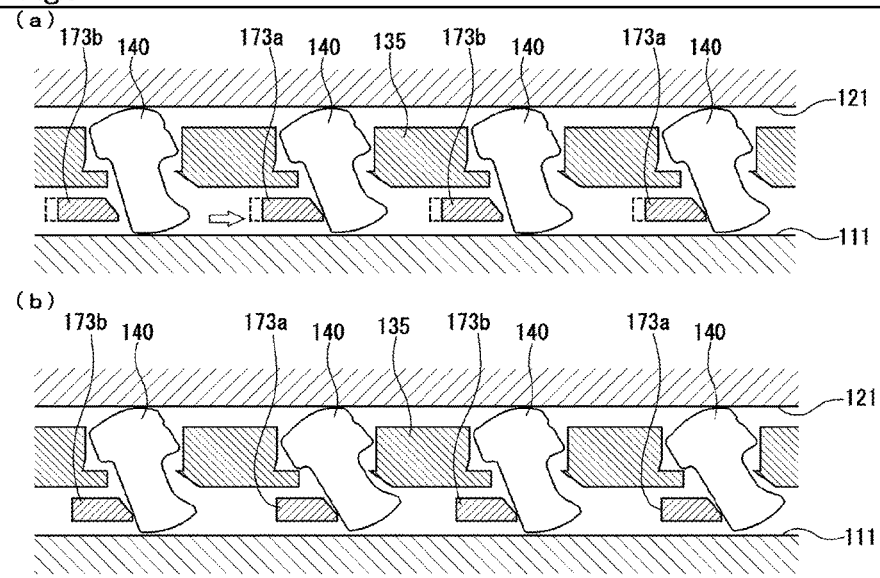

CAM CLUTCH

TECHNICAL FIELD

The present invention relates to a cam clutch switchable between two or more operating modes selected from: a two-way free mode that allows relative rotation between an inner race and an outer race in the two directions; a one-way lock mode that prohibits relative rotation between the inner race and the outer race in either a forward direction or a reverse direction; and a two-way lock mode that prohibits relative rotation between the inner race and the outer race in the two directions.

BACKGROUND ART

Two-way clutches that are switchable between drive and freewheel modes in both forward and reverse directions are known as one type of clutch that controls torque transmission and interruption.

Some types of two-way clutches are configured to switch between a lock mode that prohibits relative rotation between the inner race and the outer race (transmits torque) and a free mode that allows relative rotation between the inner race and the outer race (interrupts torque) by tilting cams or sprags (see, for example, Patent Literature 1 and Patent Literature 2).

Patent Literature 3 describes a two-way clutch having an operating mode switch mechanism that allows switching between three operating modes, i.e., two-way free mode, one-way lock mode, and two-way lock mode, by controlling a retainer that retains rollers serving as power transmission members either at a neutral position or at one engaged position on a cam surface formed on the inner circumference of the outer race.

The two-way clutch described in Patent Literature 1 engages and separates an input-side rotating member and an output-side rotating member by means of sprags that are tilted in the same direction as the rotation direction of the input-side rotating member when the input-side rotating member is rotated relative to the output-side rotating member. This poses the problem of poor responsiveness due to a time lost when the rotation direction is switched. The two-way clutch described in Patent Literature 2 entails the same problem.

The two-way clutch described in Patent Literature 3 uses plate spring members to allow power transmission in both directions. However, this two-way clutch relies on friction for the power transmission and therefore the torque transmission capacity is small despite the size of the two-way clutch.

CITATION LIST

Patent Literature

[Patent Literature 1] Japanese Patent Application Publication No. 2011-220509
[Patent Literature 2] Japanese Patent Application Publication No. 11-182589
[Patent Literature 3] Japanese Patent Application Publication No. 2014-219015

SUMMARY OF INVENTION

Technical Problem

In the cam clutches according to the patent literature above, the cam orientation changing members are arranged at constant relative positions with respect to the cams, so that all the cams change their orientation at the same timing when the operating modes of the cam clutch are switched.

To change the orientation of the cams to disengage the cams when the cam clutch is being subjected to a load torque, the operating mode switch mechanism needs to apply a disengaging torque equivalent to the load torque. This necessitates the use of a high-rigidity or large-size component as a cam orientation changing member, or of a large-scale drive source for the operating mode switch mechanism, leading to problems such as higher energy consumption or an increase in clutch size. Moreover, the large disengaging torque that is required could cause damage to the surfaces of the cams engaging with the inner race and outer race as well as the raceways of the inner race and outer race, and shorten the life of the clutch.

The present invention solves these problems, and aims to provide a cam clutch that allows, with a simple structure, easy switching between operating modes and high responsiveness, enables a reduction in energy consumption and size, and prolongs service life.

Solution to Problem

The present invention achieves the above object by providing a cam clutch including: an inner race and an outer race provided to be rotatable about a same rotation axis relative to each other; a plurality of cams circumferentially arranged between the inner race and the outer race; and a biasing means biasing each of the plurality of cams to make contact with the inner race and the outer race, the cam clutch including an operating mode switch mechanism that switches operating modes of the cam clutch, the operating mode switch mechanism including cam orientation changing parts that are movable to force the cams to rotate independently of rotation movement of the inner race and the outer race, the cam orientation changing parts each being positioned for each of the cams, at least one cam orientation changing part having a different relative position with respect to one of the cams that corresponds to the cam orientation changing part from, with respect to other cam orientation changing parts, a relative position of cams that correspond to the other cam orientation changing parts, so that the one of the cams is rotated at a different timing from the other cams.

Advantageous Effects of Invention

According to the invention set forth in claim 1, the cams can be rotated in a predetermined direction basically only by moving the cam orientation changing parts, which allows the cam clutch to readily switch the operating modes. Some of the plurality of cam orientation changing parts have a different relative position with respect to the cams. This means that the number of cams rotated at the same timing when the operating modes of the cam clutch are switched is reduced. Therefore, the disengaging torque required for disengaging the cams under a torque load can be reduced. This in turn obviates the necessity for making the cam orientation changing parts of a high-rigidity material, or increasing their size. Nor is it necessary to use a large-size drive source for the operating mode switch mechanism. Thus the cam clutch not only achieves high responsiveness but also allows for energy saving and size reduction. Moreover, the service life can be prolonged, as the engaging surfaces of the cams, the raceway of the inner race, the raceway of the outer race, and the cam orientation changing parts are less likely to suffer damage.

According to the configuration set forth in claim 2, the relative positions of the cam orientation changing parts with respect to the circumferentially equally spaced cams are varied by changing the positions of the cam orientation changing parts. Therefore, the disengaging torque can be reduced without compromising the torque transmission capacity of the cam clutch.

According to the configuration set forth in claim 3, when switching the operating modes of the cam clutch, the cam orientation is changed group by group at different timings. This allows for reduction of the disengaging torque as well as smooth mode switching.

According to the configuration set forth in claim 4, the operating mode switch mechanism is configured to move the cam orientation changing parts in a circumferential direction. This configuration does not cause complexity and requires only a minimal axial size increase. The cam orientation changing parts have an alignment pattern designed to include a section where three adjacent cam orientation changing parts are arranged with different position angles. This allows the cams to be rotated at different timings when the cam orientation changing parts are moved in the circumferential direction to switch the operating modes of the cam clutch. Thus this configuration effectively and reliably reduces the disengaging torque.

According to the configuration set forth in claims 5 and 6, the cam orientation changing parts are divided into two groups, and the orientation of the cams is changed stepwise group by group. This configuration thus enables quick mode switching with reduced disengaging torque without causing complexity. The configuration set forth in claim 5 in particular is highly effective in reducing the disengaging torque.

According to the configuration set forth in claim 7, when switching the operating modes, the cams are rotated one by one, which enables a maximum possible reduction in the disengaging torque.

According to the configuration set forth in claim 8, the operating mode switch mechanism is configured to move the cam orientation changing parts in an axial direction. The cam orientation changing parts have an alignment pattern designed to include a section where two adjacent cam orientation changing parts have different axial distances from cams corresponding thereto. This allows the cams to be rotated at different timings when the operating modes of the cam clutch are switched. Thus this configuration effectively and reliably reduces the disengaging torque.

According to the configuration set forth in claims 9 and 10, the cam orientation changing parts are divided into two groups, and the orientation of the cams is changed stepwise group by group. This configuration thus enables quick mode switching with reduced disengaging torque without causing complexity. The configuration set forth in claim 10 in particular is highly effective in reducing the disengaging torque.

According to the configuration set forth in claim 11, when switching the operating modes, the cams are rotated one by one, which enables a maximum possible reduction in the disengaging torque.

According to the configuration set forth in claim 12, the operating mode switch mechanism is configured to move the cam orientation changing parts in a radial direction. The cam orientation changing parts have an alignment pattern designed to include a section where two adjacent cam orientation changing parts have different radial distances between a contact point between a cam pressing member and a cam corresponding thereto, and a contact point between a movable element and a control plate. This allows the cams to be rotated at different timings when the operating modes of the cam clutch are switched. Thus this configuration effectively and reliably reduces the disengaging torque.

According to the configuration set forth in claims 13 and 14, the cam orientation changing parts are divided into two groups, and the orientation of the cams is changed stepwise group by group. This configuration thus enables quick mode switching with reduced disengaging torque without causing complexity. The configuration set forth in claim 14 in particular is highly effective in reducing the disengaging torque.

According to the configuration set forth in claim 15, when switching the operating modes, the cams are rotated one by one, which enables a maximum possible reduction in the disengaging torque.

According to the configuration set forth in claim 16, it is possible to switch between four operating modes, i.e., a two-way free mode allowing rotation in both forward and reverse directions, one-way lock modes allowing rotation in either the forward direction or the reverse direction, and a two-way lock mode prohibiting rotation in both forward and reverse directions, by selectively changing the orientation of one or both of the first cams and second cams.

BRIEF DESCRIPTION OF DRAWINGS

FIG. 8 is a schematic diagram illustrating the relative positions of the cam orientation changing parts with respect to the cams in the switching member shown in FIG. 7.

FIG. 9 is a schematic diagram for explaining the operation of the cam clutch shown in FIG. 1.

DESCRIPTION OF EMBODIMENTS

Embodiments of the present invention will be described with reference to the drawings. Note, however, the present invention is not limited to these embodiments.

Embodiment 1

Figure 1:
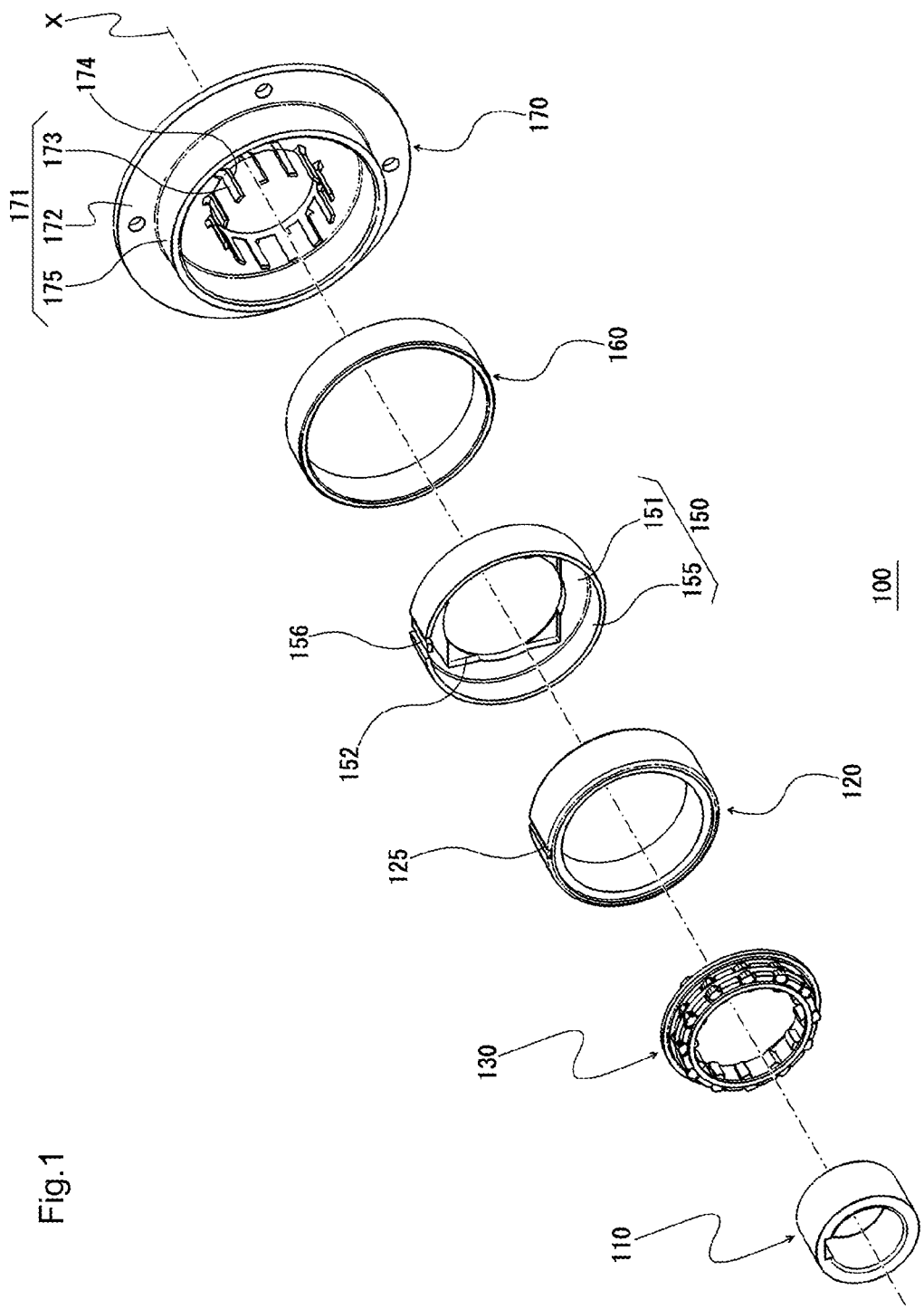
FIG. 1 is an exploded perspective view illustrating a configuration of a cam clutch according to a first embodiment of the present invention.

The cam clutch 100 according to a first embodiment of the present invention includes an inner race 110, an outer race 120, a cam mechanism 130, a cage rotation stopper 150, a coaxial alignment member 160, and an operating mode switch mechanism 170, as shown in FIG. 1.

Figure 2:
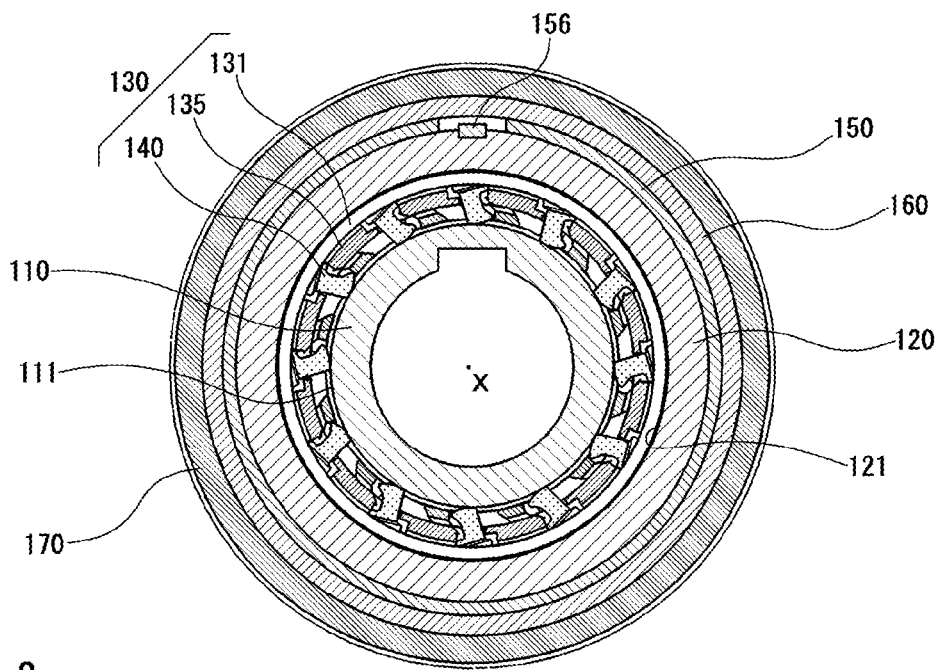
FIG. 2 is a radial cross-sectional view of the cam clutch shown in FIG. 1 in a plane perpendicular to the rotation axis of the cam clutch.
Figure 3:
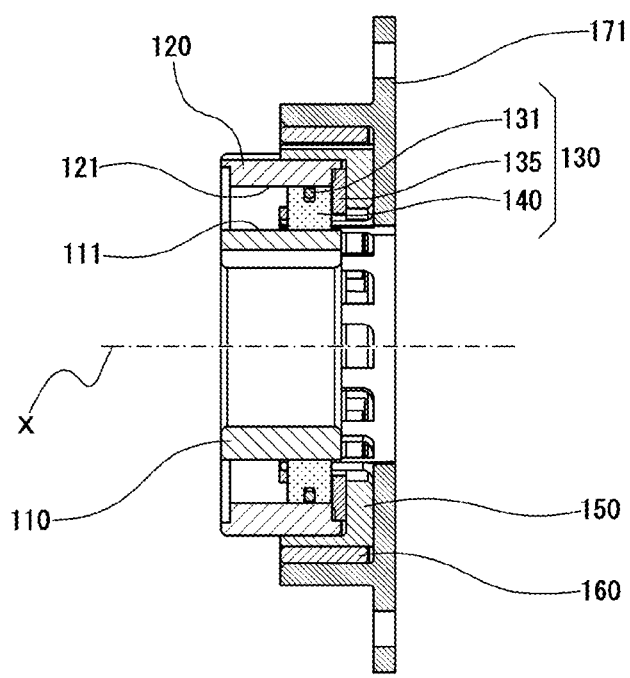
FIG. 3 is an axial cross-sectional view of the cam clutch shown in FIG. 1 in a plane containing the rotation axis of the cam clutch.

When the cam clutch 100 is assembled, the inner race 110 and outer race 120 are rotatable relative to each other about the same rotation axis X, with the raceway 111 of the inner race 110 and the raceway 121 of the outer race 120 facing each other, as shown in FIG. 2 and FIG. 3. The cam mechanism 130 is disposed between the raceway 111 of the inner race 110 and the raceway 121 of the outer race 120.

The cam mechanism 130 is made up of a plurality of cams 140 circumferentially distributed in a predetermined alignment pattern, a cage ring 135 holding each of the cams 140 on the same circumference, and a biasing means 131 that biases each of the cams 140 to make contact with the inner race 110 and the outer race 120. While the number of cams 140 in this embodiment is twelve, for example, the number of cams 140, or the shape and other features of the cams, are not particularly limited.

An annular garter spring, for example, is used as the biasing means 131 in this embodiment. However, the biasing means 131 may be any resilient member that can bias each of the cams 140 to make contact with the inner race 110 and outer race 120. A plurality of plate springs or torsion springs or the like may also be used.

The cams 140 are configured to make frictional engagement with the inner race 110 and outer race 120 when the inner race 110 rotates in one direction (counterclockwise in FIG. 2) relative to the outer race 120, for example, and to tilt in a direction in which the cams separate from the inner race 110 and outer race 120 when the inner race 110 rotates in the other direction (clockwise in FIG. 2) relative to the outer race 120.

Figure 4:
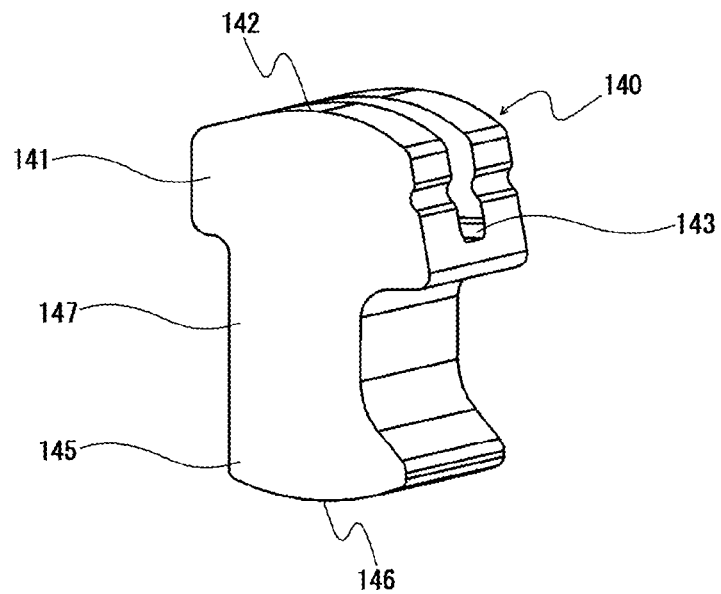
FIG. 4 is a perspective view illustrating a configuration of a cam in the cam clutch shown in FIG. 1.

The cam 140 in this embodiment includes, as shown in FIG. 4, a head part 141 having a circumferential surface formed in an arcuate curved shape protruding radially outward and constituting a radially outer engagement surface 142 making contact with the outer race 120, a leg part 145 having a circumferential surface formed in an arcuate curved shape protruding radially inward and constituting a radially inner engagement surface 146 making contact with the inner race 110, and a support part 147 connecting the head part 141 and the leg part 145. The head part 141 extends out from the support part 147 in the circumferential direction.

The radially outer engagement surface 142 of the cam 140 is formed with a garter spring holding groove 143 in a central part in a direction perpendicular to the end face of the cam 140 (axial direction). The garter spring holding groove 143 is designed to impart a clockwise (in FIG. 2) rotational moment to the cam 140.

The cage ring 135 in this embodiment is configured to hold a plurality of cams 140 such that the cams 140 are arranged at circumferentially equal intervals.

Figure 5:
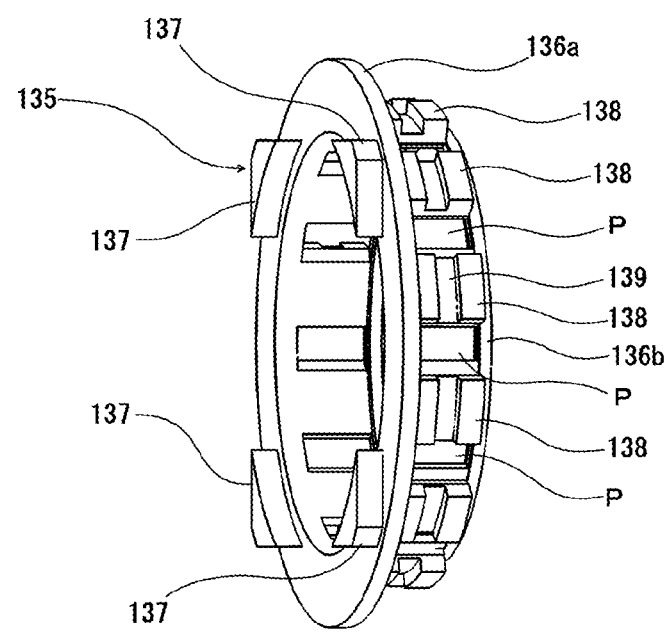
FIG. 5 is a perspective view illustrating a configuration of a cage ring in the cam clutch shown in FIG. 1.

The cage ring 135 includes, as shown in FIG. 5, a pair of annular plates 136a and 136b axially opposite each other, and a plurality of brace members 138 axially extending at circumferentially equally spaced positions and connecting the annular plates 136a and 136b, the spaces between adjacent brace members 138 forming pockets P. One annular plate 136a is designed to have larger outer dimensions than the other annular plate 136b to fit into a recess formed in one end face of the outer race 120.

Each of the brace members 138 protrudes radially outward more than the outer peripheral edge of the other annular plate 136b, and is formed with a circumferentially extending garter spring mount groove 139 in an outer circumferential surface thereof.

One annular plate 136a is formed with axially outwardly protruding engagement protrusions 137 on the outer surface.

The cams 140 are inserted into the pockets P from the leg part 145 such that the support parts 147 are positioned inside the pockets P. With the garter spring mounted, the cams are held on the cage ring 135. This restricts the circumferential positions of the cams 140, as well as the orientation of the cams 140, so that all the cams 140 are brought into contact with the inner race 110 and outer race 120 without variations in their orientation (inclination).

The cage rotation stopper 150 includes, as shown in FIG. 1, an annular plate part 151 that makes surface contact with one annular plate 136a of the cage ring 135 and restricts axial movements of the cam mechanism 130, and a circumferential wall part 155 fitted over the outer race 120 and axially extending from an outer peripheral edge on one side of the annular plate part 151.

Engagement recesses 152 are formed in the inner surface of the annular plate part 151, for the engagement protrusions 137 of the cage ring 135 to engage with. An engagement pawl 156 is formed on the circumferential wall part 155, to make sliding engagement with an axially extending recessed groove 125 formed on the outer circumferential surface of the outer race 120. This engagement stops the rotation of the cage ring 135 relative to the outer race 120.

The operating mode switch mechanism 170 of the cam clutch 100 in this embodiment is configured to switch the operating modes of the cam clutch 100 between a lock mode that prohibits relative rotation between the inner race 110 and outer race 120, and a free mode that allows relative rotation between the inner race 110 and outer race 120.

The operating mode switch mechanism 170 includes a switching member 171 that is rotatable independently of the rotation of the inner race 110 and the outer race 120.

The switching member 171 includes, as shown in FIG. 1, an annular plate-like end wall part 172, a plurality of cam orientation changing parts 173 integrally formed on one side of the end wall part 172 and each corresponding to each of the cams 140, and a circumferential wall part 175 that is positioned on the same rotation axis X as that of the inner race 110 and outer race 120 and extends axially from an outer peripheral edge on one side of the end wall part 172.

The circumferential wall part 175 of the switching member 171 is fitted over the cage rotation stopper 150 via the coaxial alignment member 160. The switching member 171 is rotated to move the cam orientation changing parts 173 in the circumferential direction to force the cams 140 to rotate.

The cam orientation changing parts 173 are formed as axially extending pieces for example, and each include a base portion axially extending from an inner peripheral edge on one side of the end wall part 172 at an angle toward one circumferential direction, and a cam pressing portion axially extending continuously from the distal end of the base portion.

The cam pressing portion has a cam pressing surface 174 that makes contact with the cam 140 and presses the cam 140 when the orientation of the cam is to be changed.

While the cam orientation changing parts 173 are integrally formed with the end wall part 172 in this embodiment, they may be provided separately from the end wall part 172, as long as they are able to force the cams 140 to rotate independently of the rotation of the inner race 110 and outer race 120.

The cam clutch 100 of this embodiment is designed such that at least one cam orientation changing part 173 has a different relative position with respect to the corresponding cam 140 from the relative positions of other cam orientation changing parts 173 with respect to their corresponding cams 140, so that the at least one cam orientation changing part 173 causes the cam 140 to rotate at a different timing from other cams 140.

As described above, the cams 140 are arranged at circumferentially equal intervals in this embodiment. Accordingly, the relative positions of the cam orientation changing parts 173 with respect to the cams 140 are tailored by adjusting the alignment pattern of the cam orientation changing parts 173. Namely, the relative positions are varied by changing the positions of the cam orientation changing parts 173 relative to the circumferentially equally spaced cams 140. Therefore, the disengaging torque can be reduced without compromising the torque transmission capacity of the cam clutch 100.

It is also possible to provide the cam orientation changing parts 173 in an alignment pattern in which they are arranged at circumferentially equal intervals. In this case, the relative positions of the cam orientation changing parts 173 with respect to the cams 140 may be tailored by adjusting the alignment pattern of the cams 140.

Figure 6:
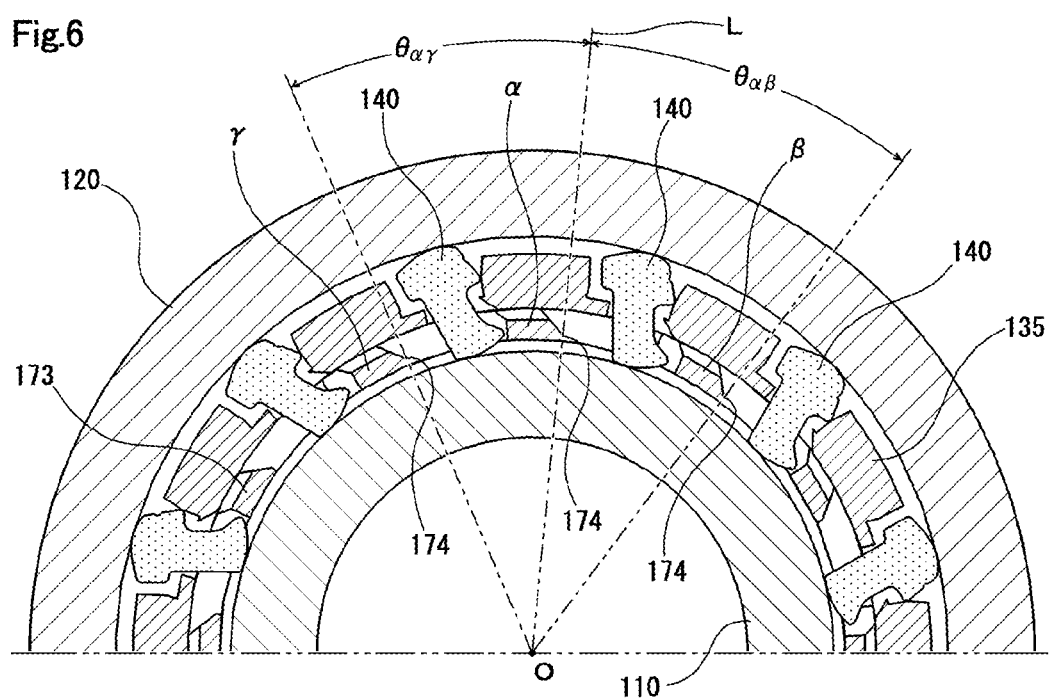
FIG. 6 is a radial partial cross-sectional view for explaining the relative positions of the cam orientation changing parts with respect to the cams.

The relative positions of the cam orientation changing parts 173 with respect to the cams 140 are described in more specific terms. As shown in FIG. 6, the cam orientation changing parts 173 are positioned in a certain alignment pattern in a cross section perpendicular to the rotation axis O, in which α denotes a reference cam orientation changing part and L represents a reference line L that connects the position of the reference cam orientation changing part α and the rotation axis O. In this alignment pattern, there are sections where the position angle θαβ of one-side cam orientation changing part β, which is adjacent the reference cam orientation changing part α on one circumferential side, relative to the reference line L is different from the other-side position angle θαγ of the cam orientation changing part γ, which is adjacent the reference cam orientation changing part α on the other circumferential side, relative to the reference line L. The position of the cam orientation changing part 173 here refers to the circumferential position of the cam pressing surface 174.

In the cam clutch 100 of this embodiment, the cam orientation changing parts 173 are divided into two groups. The cam orientation changing parts 173 of each group have the same relative position with respect to the corresponding cams 140 so as to rotate the cams 140 at the same timing.

Figure 7:
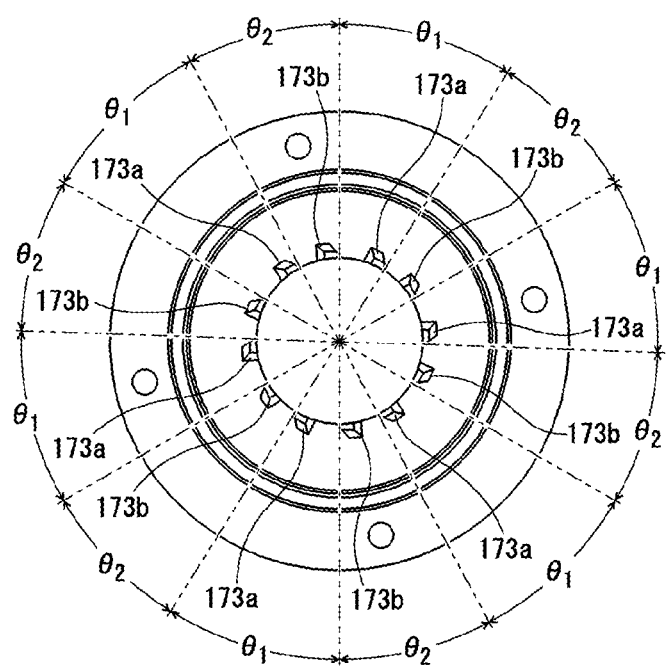
FIG. 7 is a plan view illustrating a configuration of a switching member in the cam clutch shown in FIG. 1.

Specifically, as shown in FIG. 7, the cam orientation changing parts 173 have an alignment pattern in which sections with a first position angle θ1 and sections with a second position angle θ2 alternate each other. The first position angle θ1 is the angle between the cam orientation changing parts 173a of the first group, which rotate the cams 140 at an earlier timing in the operation of changing the orientation of the cams, and the cam orientation changing parts 173b of the second group, which each adjoin the cam orientation changing parts 173a on the other circumferential side and which rotate the cams at a different timing from that of the first group. The second position angle θ2 is the angle between the cam orientation changing parts 173a of the first group and the cam orientation changing parts 173b of the second group adjoining the cam orientation changing parts 173a on one circumferential side.

While the cam orientation changing parts 173 in this embodiment are divided into two groups, they may be divided into three or more groups.

Although the sizes of the first position angle θ1 and the second angle θ2 are not particularly limited, the first position angle θ1 is 31.5°, for example, and the second angle θ2 is 28.5°, for example.

This alignment pattern of the cam orientation changing parts 173 translates as a difference between the distance d1 in the circumferential direction (moving direction of the cam orientation changing part 173a) between the cam orientation changing parts 173a of the first group and the corresponding cams 140, and the distance d2 in the circumferential direction (moving direction of the cam orientation changing part 173b) between the cam orientation changing parts 173b of the second group and the corresponding cams 140 as shown in FIG. 8, causing the cam orientation changing parts 173a and 173b to make contact with the cams 140 at different timings. Namely, when switching the operating modes of the cam clutch 100, the change in the cam orientation for the cams 140 is implemented at timings different between a first group and a second group of the cams. This allows for reduction of the disengaging torque as well as smooth mode switching. Specifically, dividing the cam orientation changing parts 173 in two groups and changing the orientation of the cams 140 stepwise group by group enables quick mode switching with reduced disengaging torque without causing complexity.

For convenience of explanation, FIG. 8 illustrates the raceway 111 of the inner race 110 and the raceway 121 of the outer race 120 as parallel flat surfaces. The relative positional relationship between the cams 140 and the cam orientation changing parts 173 is illustrated in an exaggerated manner for easier understanding.

Hereinafter, the operation of the cam clutch 100 according to the above first embodiment will be described with reference to FIG. 9. Similarly to FIG. 8, FIG. 9 illustrates the raceway 111 of the inner race 110 and the raceway 121 of the outer race 120 as parallel flat surfaces for convenience of explanation. The relative positional relationship between the cams 140 and the cam orientation changing parts 173 is illustrated in an exaggerated manner for easier understanding.

Note, first, that, when the cam orientation changing parts 173a and 173b are at positions where they do not touch the cams 140 and do not restrict the orientation of the cams 140 (see FIG. 8), the cam clutch 100 is in the one-way lock mode that prohibits rotation of the inner race 110 relative to the outer race 120 in one direction (counterclockwise in FIG. 2). That is, all the cams 140 are maintained in the standby state where they can immediately start wedging against the inner race 110 and outer race 120 upon application of torque on either the inner race 110 or the outer race 120. When the inner race 110 is rotated in one direction, for example, the cams 140 rotate or tilt in the engaging direction, and wedge against the inner race 110 and outer race 120. When the torque is removed from the inner race 110, the cams 140 rotate or tilt in the disengaging direction, and return to the standby position. When the inner race 110 is rotated in the other direction, the inner race 110 freewheels.

When the switching member 171 is rotated in the other direction (clockwise in FIG. 2) manually or by a suitable drive source, the cam orientation changing parts 173a of the first group press their corresponding cams 140, so that some of the cams 140 are rotated in advance to tilt in the disengaging direction, as shown in FIG. 9(a).

Next, the cam orientation changing parts 173b of the second group press their corresponding cams 140, so that all the other cams 140 are rotated to tilt in the disengaging direction, as shown in FIG. 9(b). This restricts the orientation of all the cams 140 out of contact with the inner race 110 and outer race 120, and thus the operating mode of the cam clutch 100 is switched from the one-way lock mode to the free mode that allows rotation of the inner race 110 relative to the outer race 120 in both directions.

The cam clutch 100 according to the above first embodiment allows for easy switching of the operating modes of the cam clutch 100 because the cams 140 can be rotated in a predetermined direction by circumferentially moving the cam orientation changing parts 173, which is achieved basically only by rotating the switching member 171. That some of the cam orientation changing parts 173 have a different relative position with respect to the cams 140 means that the number of cams 140 rotated at the same timing when the operating modes of the cam clutch 100 are switched is reduced. Therefore, the disengaging torque required for disengaging the cams 140 under a torque load can be reduced.

This in turn obviates the necessity for making the cam orientation changing parts 173 of a high-rigidity material, or increasing their size. Nor is it necessary to use a large-size drive source for the operating mode switch mechanism. Thus this cam clutch 100 not only achieves high responsiveness but also allows for energy saving and size reduction. Moreover, the service life can be prolonged, as the engaging surfaces of the cams 140, the raceway 111 of the inner race 110, the raceway 121 of the outer race 120, and the cam orientation changing parts 173 are less likely to suffer damage.

Embodiment 2

The cam clutch according to a second embodiment of the present invention has substantially the same configuration as the cam clutch 100 according to the first embodiment described above except for differences in the configuration of the switching member in the operating mode switch mechanism.

Figure 10:
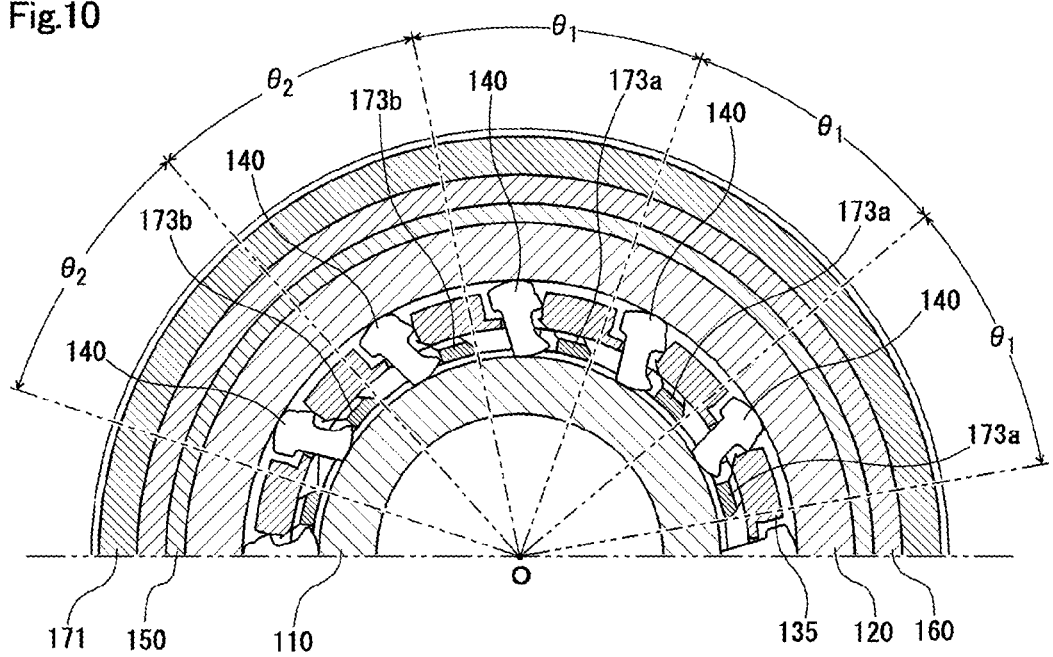
FIG. 10 is a radial partial cross-sectional view illustrating a schematic configuration of a cam clutch according to a second embodiment of the present invention.
Figure 11:
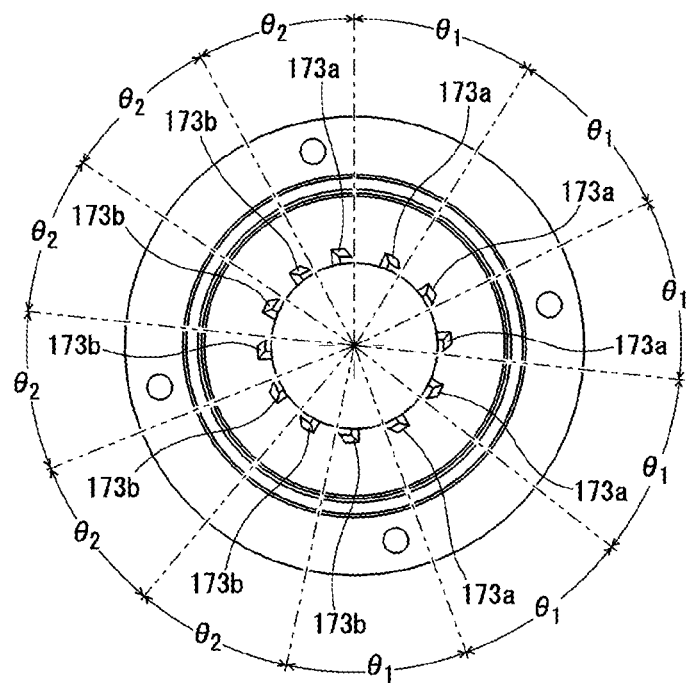
FIG. 11 is a plan view illustrating a configuration of a switching member in the cam clutch shown in FIG. 10.

The switching member 171 according to this embodiment has two groups of cam orientation changing parts 173a and 173b. The cam orientation changing parts of each group have the same relative position with respect to the corresponding cams 140 so as to rotate the cams 140 at the same timing, as shown in FIG. 10 and FIG. 11.

Specifically, the cam orientation changing parts 173 have an alignment pattern that includes a section where the cam orientation changing parts 173a of the first group, which rotate their cams 140 at an earlier timing in the operation of changing the orientation of the cams, are arranged in succession with a first position angle θ1, and a section where the cam orientation changing parts 173b of the second group, which rotate their cams 140 at a different timing from that of the first group, are arranged in succession with a second position angle θ2.

In this embodiment, too, the cam orientation changing parts 173 may be divided into three or more groups.

Although the sizes of the first position angle θ1 and the second angle θ2 not particularly limited, the first position angle θ1 is 31.5°, for example, and the second angle θ2 is 28.5°, for example.

In this embodiment, the cam orientation changing parts 173 have an alignment pattern that includes one each section, where the cam orientation changing parts 173a of the first group are arranged with a first position angle θ1, and where the cam orientation changing parts 173b of the second group are arranged with a second position angle θ2. Instead, the alignment pattern may include a plurality of one or both of the section where the cam orientation changing parts 173a of the first group are arranged with a first position angle θ1, and the section where the cam orientation changing parts 173b of the second group are arranged with a second position angle θ2.

The number of cam orientation changing parts belonging to each group may be the same, or different.

Figure 12:
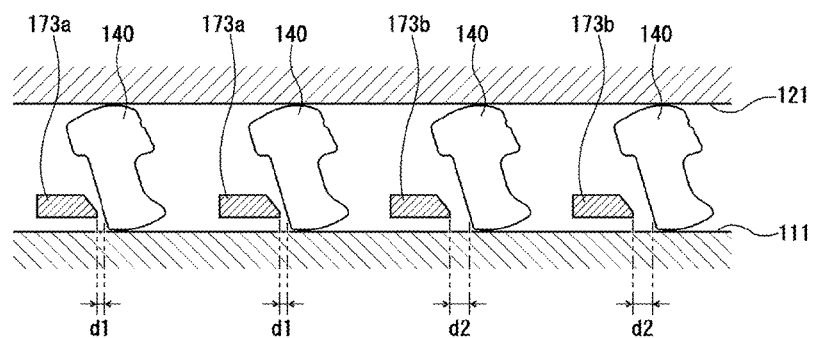
FIG. 12 is a schematic diagram illustrating the relative positions of the cam orientation changing parts with respect to the cams in the switching member shown in FIG. 11.

In this cam clutch according to this embodiment, too, the distance d1 in the circumferential direction (moving direction of the cam orientation changing part 173a) between the cam orientation changing parts 173a of the first group and the corresponding cams 140, is different from the distance d2 in the circumferential direction (moving direction of the cam orientation changing part 173b) between the cam orientation changing parts 173b of the second group and the corresponding cams 140, as shown in FIG. 12, causing the cam orientation changing parts 173a and 173b to make contact with the cams 140 at different timings. Namely, when switching the operating modes of the cam clutch 100, the change in the cam orientation for the cam 140 is implemented at timings different between a first group and a second group of the cams. This allows for reduction of the disengaging torque as well as smooth mode switching.

Figure 13:
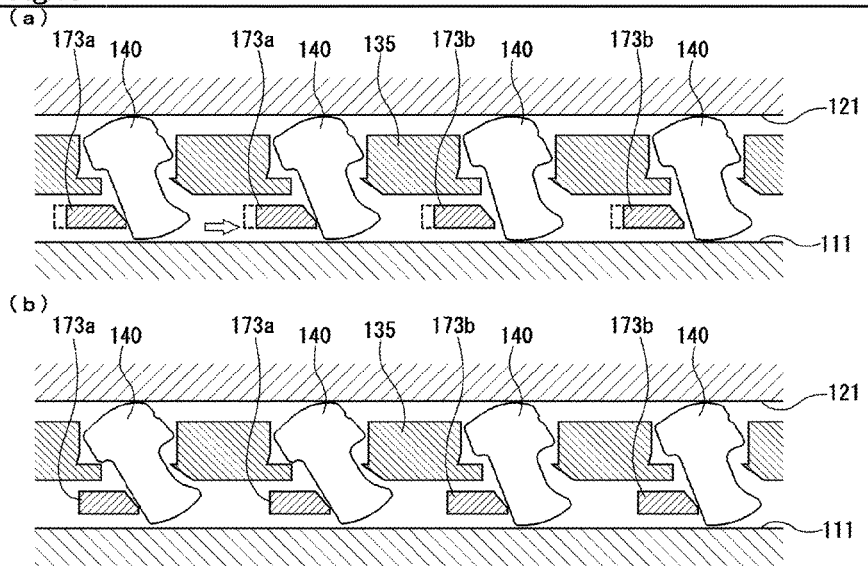
FIG. 13 is a schematic diagram for explaining the operation of the cam clutch shown in FIG. 10.

The operation of the cam clutch according to this embodiment will be described with reference to FIG. 13. For convenience of explanation, FIG. 13 illustrates the raceway 111 of the inner race 110 and the raceway 121 of the outer race 120 as parallel flat surfaces. The relative positional relationship between the cams 140 and the cam orientation changing parts 173 is illustrated in an exaggerated manner for easier understanding.

Note, first, that, when the cam orientation changing parts 173a and 173b are at positions where they do not touch the cams 140 and do not restrict the orientation of the cams 140 (see FIG. 12), the cam clutch is in the one-way lock mode that prohibits rotation of the inner race 110 relative to the outer race 120 in one direction (counterclockwise in FIG. 10).

When the switching member 171 is rotated in the other direction (clockwise in FIG. 10) manually or by a suitable drive source, the cam orientation changing parts 173a of the first group press their corresponding cams 140, so that some of the cams 140 are rotated in advance to tilt in the disengaging direction, as shown in FIG. 13(a).

Next, the cam orientation changing parts 173b of the second group press their corresponding cams 140, so that all the other cams 140 are rotated to tilt in the disengaging direction, as shown in FIG. 13(b). This restricts the orientation of all the cams 140 out of contact with the inner race 110 and outer race 120, and thus the operating mode of the cam clutch 100 is switched from the one-way lock mode to the free mode that allows rotation of the inner race 110 relative to the outer race 120 in both directions.

In the cam clutch according to the above second embodiment, too, the cam orientation changing parts include the cam orientation changing parts 173a or 173b that have a different relative position with respect to the cams 140, so that the number of cams 140 rotated at the same timing when the operating modes of the cam clutch are switched is reduced. Therefore, the disengaging torque required for disengaging the cams 140 under a torque load can be reduced.

Embodiment 3

The cam clutch according to a third embodiment of the present invention has substantially the same configuration as the cam clutch 100 according to the first embodiment described above except for differences in the configuration of the switching member in the operating mode switch mechanism.

Figure 14:
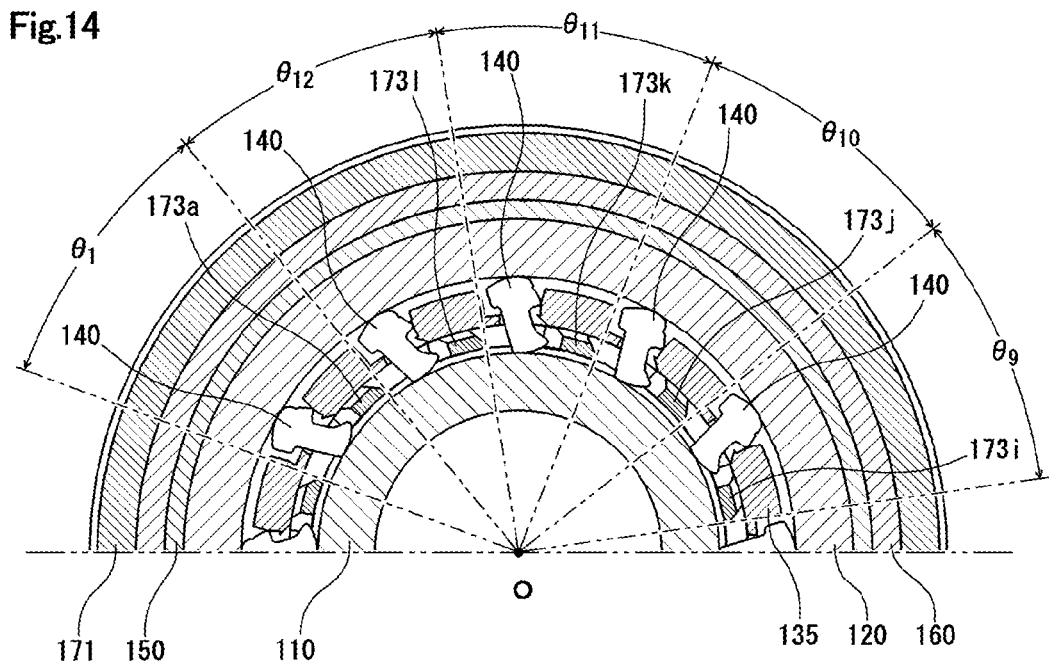
FIG. 14 is a radial partial cross-sectional view illustrating a schematic configuration of a cam clutch according to a third embodiment of the present invention.
Figure 15:
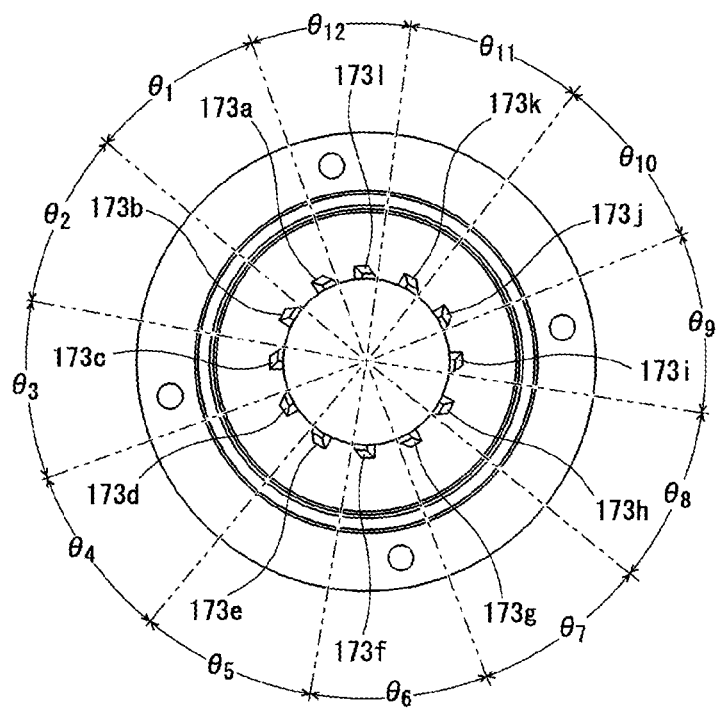
FIG. 15 is a plan view illustrating a configuration of a switching member in the cam clutch shown in FIG. 14.

The switching member 171 according to this embodiment has multiple groups of cam orientation changing parts 173a to 173l. The cam orientation changing parts of each group have the same relative position with their corresponding cams 140 so as to rotate the cams 140 at the same timing, as shown in FIG. 14 and FIG. 15.

Specifically, the cam orientation changing parts 173 have an alignment pattern in which the position angles θ1 to θ12 between two adjacent cam orientation changing parts 173 are different from each other. In this embodiment, the cam orientation changing parts 173 have an alignment pattern in which the position angle increases sequentially by a constant increment in the other circumferential direction. To give an example, the first position angle θ1 is 30.00°, for example, and the n-th position angle θn (where n is an integer from 2 to 11) is larger than the (n−1)th position angle θn−1 by 0.05°, for example. The twelfth position angle θ12 is 27.25°, for example. The position angles θ1 to θ12 are not limited to particular angles, and the increment of the position angles may be varied. The alignment pattern of the cam orientation changing parts 173 does not require a sequential increase in the position angle. The pattern may be designed such that the position angle changes irregularly.

Figure 16:
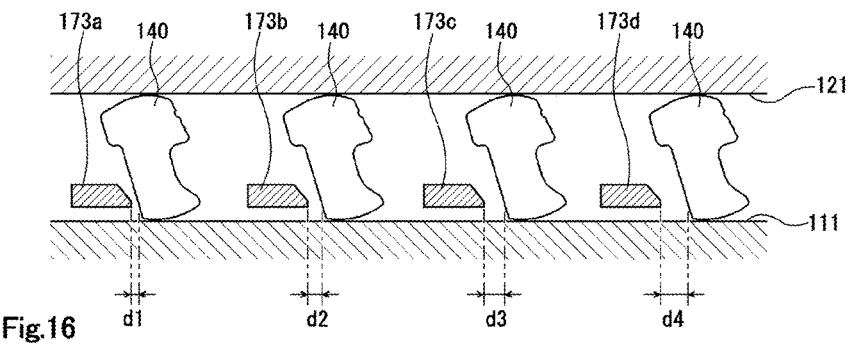
FIG. 16 is a schematic diagram illustrating the relative positions of the cam orientation changing parts with respect to the cams in the switching member shown in FIG. 15.

In this cam clutch according to this embodiment, too, the distances dn (where n is an integer from 1 to 12) in the circumferential direction (moving direction of the cam orientation changing part) between the respective n-th group cam orientation changing parts 173n (where n is an integer from 1 to 12) and the corresponding cams 140 are different from each other as shown in FIG. 16 (for convenience of illustration, FIG. 16 shows the relative positions of only four cam orientation changing parts 173a to 173d with respect to the cams).

Therefore, the cam orientation changing parts 173a to 173l come into contact with the cams 140 at different timings. Namely, when switching the operating modes of the cam clutch 100, the orientation of the cams 140 is changed group by group at different timings, such as to rotate the cams 140 one by one. This allows for a maximum possible reduction in the disengaging torque.

Figure 17:
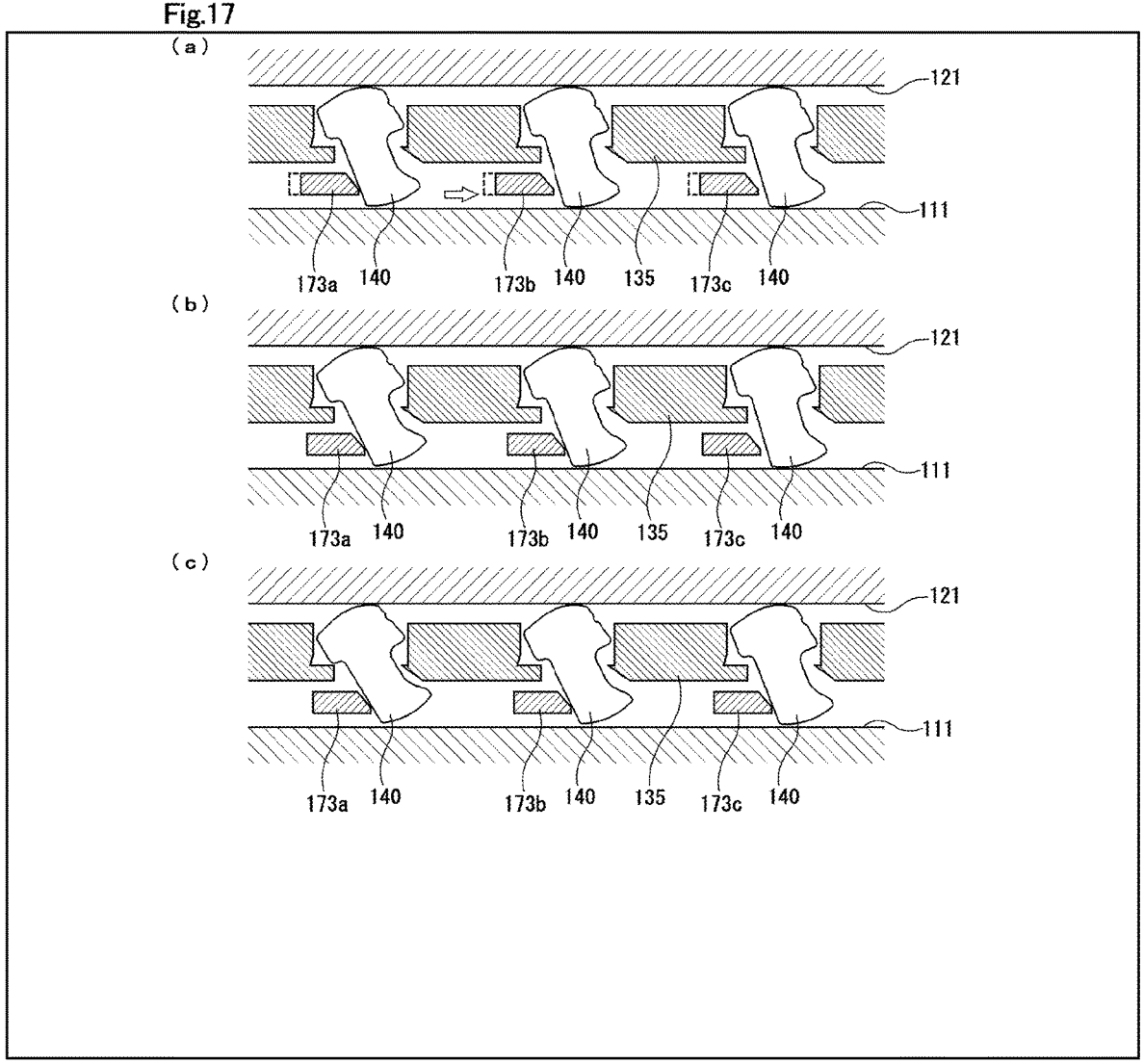
FIG. 17 is a schematic diagram for explaining the operation of the cam clutch shown in FIG. 14.

The operation of the cam clutch according to this embodiment will be described with reference to FIG. 17. For convenience of explanation, FIG. 17 illustrates the raceway 111 of the inner race 110 and the raceway 121 of the outer race 120 as parallel flat surfaces. The relative positional relationship between the cams 140 and the cam orientation changing parts 173 is illustrated in an exaggerated manner for easier understanding.

Note, first, that, when the cam orientation changing parts 173a, 173b, and 173c are at positions where they do not touch the cams 140 and do not restrict the orientation of the cams 140 (see FIG. 16), the cam clutch is in the one-way lock mode that prohibits rotation of the inner race 110 relative to the outer race 120 in one direction (counterclockwise in FIG. 14).

When the switching member 171 is rotated in the other direction (clockwise in FIG. 14) manually or by a suitable drive source, the cam orientation changing part 173a of the first group presses the corresponding cam 140, so that one cam 140 is rotated in advance to tilt in the disengaging direction, as shown in FIG. 17(a).

Next, the cam orientation changing part 173b of the second group adjacent the cam orientation changing part 173a of the first group presses the corresponding cam 140, so that the second cam 140 is rotated to tilt in the disengaging direction, as shown in FIG. 17(*b*).

Similarly, the cam orientation changing part 173*c* of the third group adjacent the cam orientation changing part 173*b* of the second group presses the corresponding cam 140, so that the third cam 140 is rotated to tilt in the disengaging direction, as shown in FIG. 17(*c*).

The orientation of the cams is changed stepwise in this manner for each of multiple groups, eventually restricting the orientation of all the cams 140 out of contact with the inner race 110 and outer race 120. Thus the operating mode of the cam clutch 100 is switched from the one-way lock mode to the free mode that allows rotation of the inner race 110 relative to the outer race 120 in both directions.

Embodiment 4

The cam clutch according to a fourth embodiment of the present invention has substantially the same configuration as the cam clutch 100 according to the first embodiment described above as shown in FIG. 18 and FIG. 19, except for differences in the configuration of the switching member 171 in the operating mode switch mechanism.

The switching member 171 according to this embodiment is configured to move the cam orientation changing parts 173 in an axial direction to force the cams 140 to rotate independently of the rotation of the inner race 110 and outer race 120.

The switching member 171 includes an annular plate-like end wall part 172, a plurality of cam orientation changing parts 173 integrally formed on one side of the end wall part 172, each corresponding to each of the plurality of cams 140, and a circumferential wall part 175 that has the same rotation axis O with the inner race 110 and outer race 120 and extends axially from outer peripheral edges of both sides of the end wall part 172.

The cam orientation changing parts 173 each have a tapered portion 176 at the distal end on a side facing the corresponding cam, decreasing in width toward the front in the moving direction of the switching member. The side face of the tapered portion 176 forms the cam pressing surface.

The cam orientation changing parts 173 are arranged at circumferentially equal intervals, and divided into two groups, and the cam orientation changing parts of each of the groups have the same relative position with respect to the corresponding cams 140 so as to rotate the cams 140 at the same timing.

Figure 20:
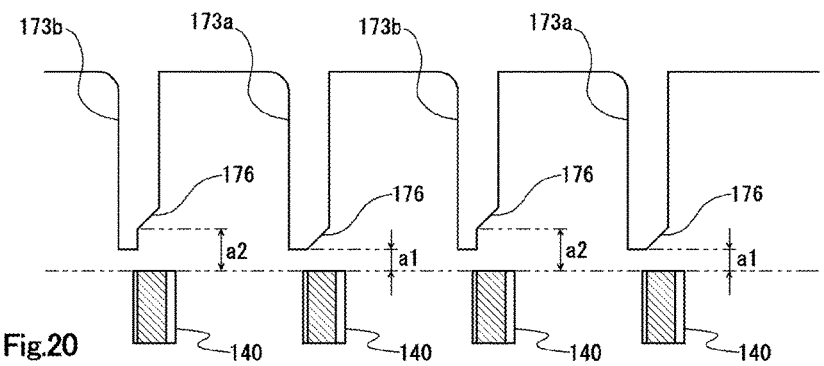
FIG. 20 is a schematic diagram illustrating the relative positions of the cam orientation changing parts with respect to the cams in the switching member shown in FIG. 19.

Specifically, the cam orientation changing parts 173 include a first group of cam orientation changing parts 173*a*, with the tapered portion 176 starting from the distal end face, and a second group of cam orientation changing parts 173*b*, with the tapered portion 176 starting from a point more to the rear in the moving direction of the switching member than the distal end, as shown in FIG. 20. The cam orientation changing parts 173*a* of the first group and the cam orientation changing parts 173*b* of the second group have different relative positions with respect to their corresponding cams 140 from each other.

Namely, the distance a1 in the axial direction (moving direction of the cam orientation changing part 173*a*) between the cam orientation changing parts 173*a* of the first group and the corresponding cams 140, is different from the distance a2 in the axial direction (moving direction of the cam orientation changing part 173*b*) between the cam orientation changing parts 173*b* of the second group and the corresponding cams 140, causing the cam orientation changing parts 173*a* and 173*b* to make contact with the cams 140 at different timings. Namely, when switching the operating modes of the cam clutch, the change in the cam orientation for the cams 140 is implemented at timing different between a first group and a second group of the cams. This allows for reduction of the disengaging torque as well as smooth mode switching.

In the switching member 171 according to this embodiment, the cam orientation changing parts 173 have an alignment pattern in which the cam orientation changing parts 173*a* of the first group having a first axial distance a1 to their cams, and the cam orientation changing parts 173*b* of the second group having a second axial distance a2 to their cams, circumferentially alternate each other.

Figure 21:
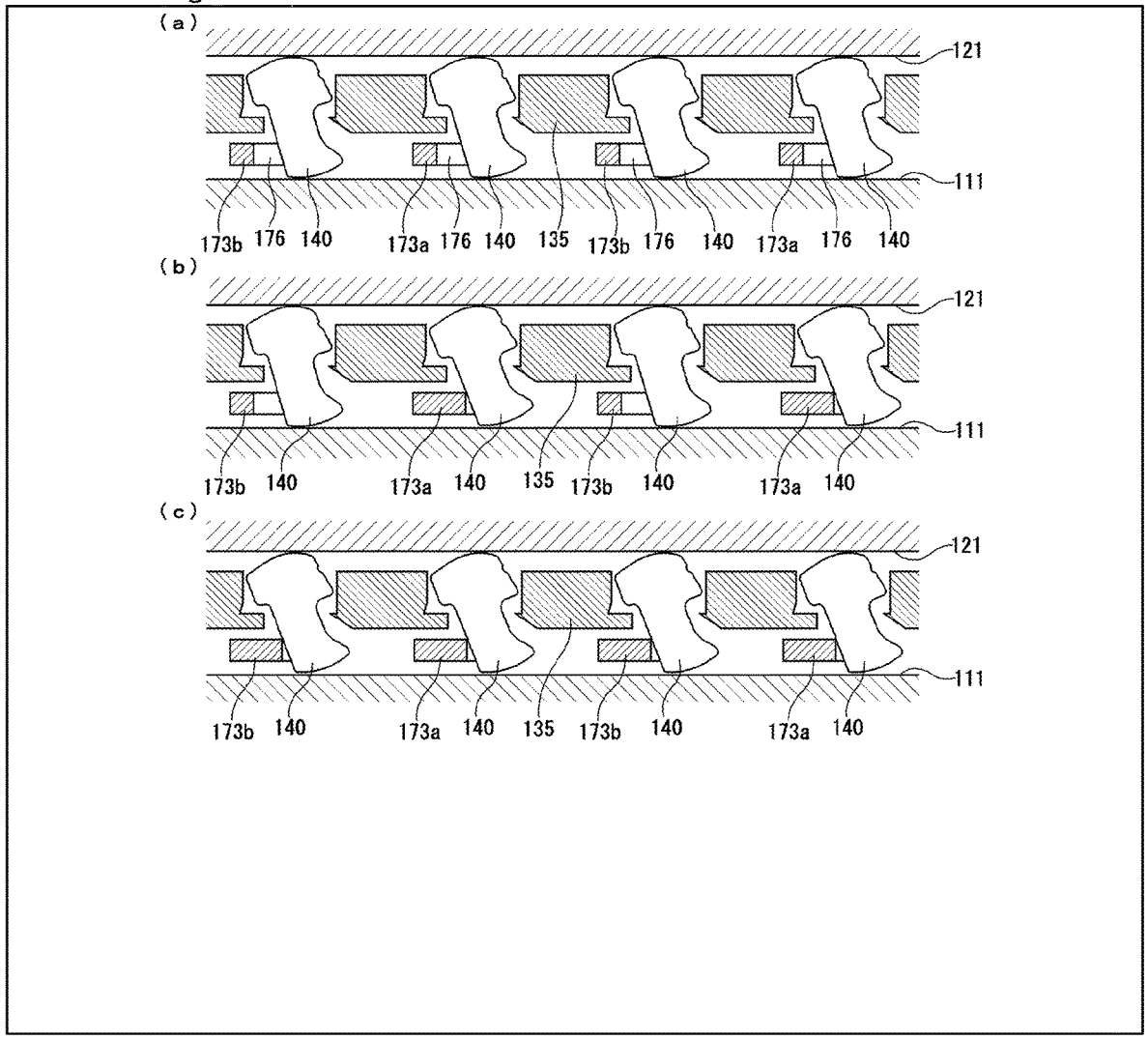
FIG. 21 is a schematic diagram for explaining the operation of the cam clutch shown in FIG. 18.

The operation of the cam clutch according to this embodiment will be described with reference to FIG. 21. For convenience of explanation, FIG. 21 illustrates the raceway 111 of the inner race 110 and the raceway 121 of the outer race 120 as parallel flat surfaces. The relative positional relationship between the cams 140 and the cam orientation changing parts 173 is illustrated in an exaggerated manner for easier understanding.

Figure 18:
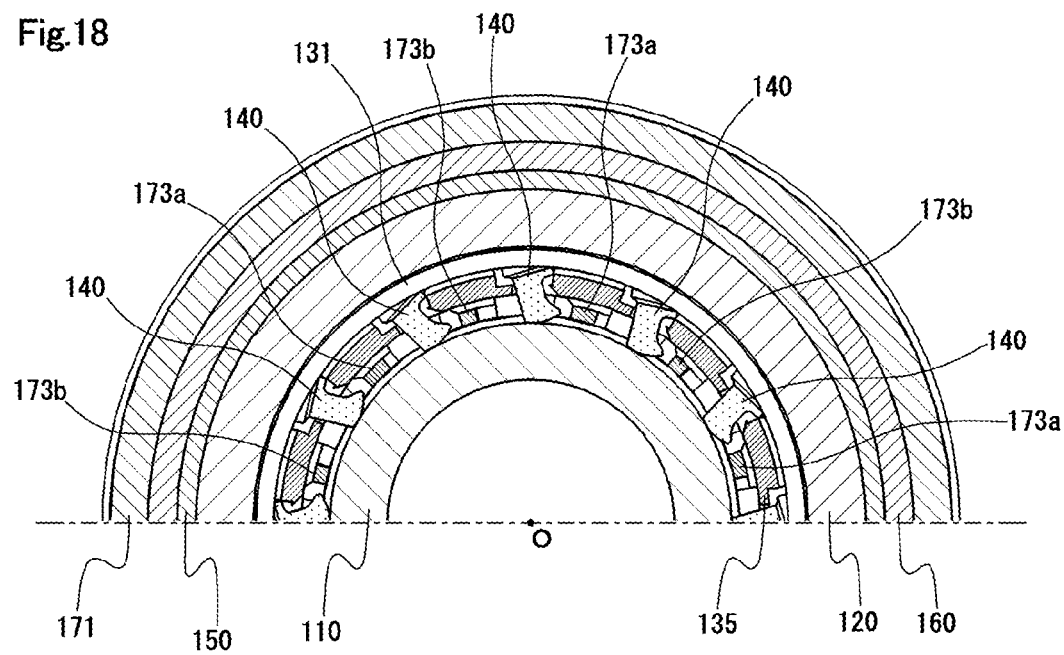
FIG. 18 is a radial partial cross-sectional view illustrating a configuration of a cam clutch according to a fourth embodiment of the present invention.
Figure 19:
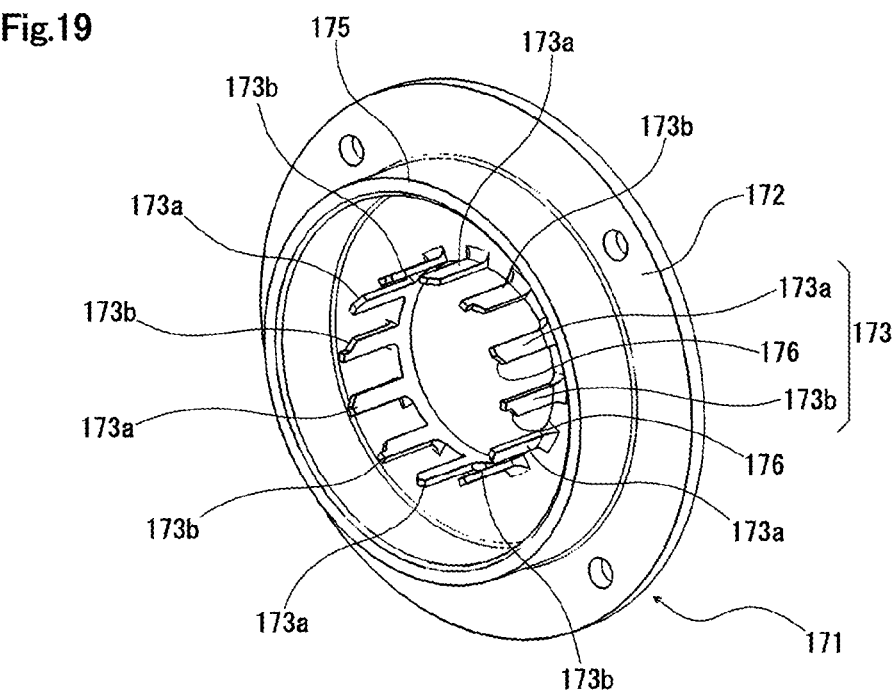
FIG. 19 is a perspective view illustrating a configuration of a switching member in the cam clutch shown in FIG. 18.

Note, first, that, when the cam orientation changing parts 173*a* and 173*b* are at positions where they do not touch the cams 140 and do not restrict the orientation of the cams 140 as shown in FIG. 21(*a*), the cam clutch is in the one-way lock mode that prohibits rotation of the inner race 110 relative to the outer race 120 in one direction (counterclockwise in FIG. 18).

When the switching member 171 is moved in the axial direction manually or by a suitable drive source, the cam orientation changing parts 173*a* of the first group press their corresponding cams 140, so that some of the cams 140 are rotated in advance to tilt in the disengaging direction by the action of the tapered portions 176, as shown in FIG. 21(*b*).

Next, the cam orientation changing parts 173*b* of the second group press their corresponding cams 140, so that all the other cams 140 are rotated to tilt in the disengaging direction by the action of the tapered portions 176, as shown in FIG. 21(*c*). This restricts the orientation of all the cams 140 out of contact with the inner race 110 and outer race 120, and thus the operating mode of the cam clutch is switched from the one-way lock mode to the free mode that allows rotation of the inner race 110 relative to the outer race 120 in both directions.

Figure 22A:
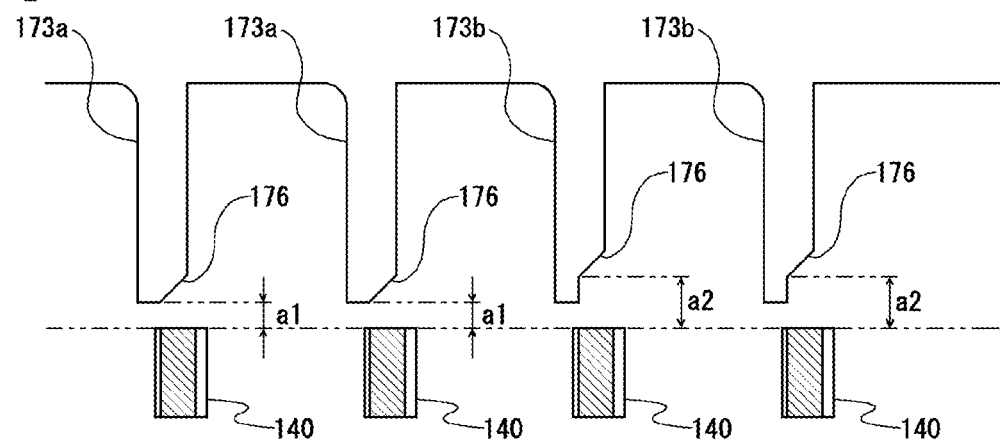
FIG. 22A is a schematic diagram illustrating the relative positions of the cam orientation changing parts with respect to the cams in another example of the switching member that is part of the cam clutch according to the fourth embodiment.

In the embodiment described above, the cam orientation changing parts 173 have an alignment pattern in which the cam orientation changing parts 173*a* of the first group and the cam orientation changing parts 173*b* of the second group circumferentially alternate each other. This is not intended to limit the alignment pattern of the cam orientation changing parts 173 to a particular type. The cam orientation changing parts 173 may have an alignment pattern that includes a section where the cam orientation changing parts 173*a* of the first group are arranged in succession, and a section where the cam orientation changing parts 173*b* of the second group are arranged in succession, as shown in FIG. 22A, for example. Moreover, the cam orientation changing parts 173 may have an alignment pattern that includes a plurality of one or more of the section where the cam orientation changing parts 173*a* of the first group are arranged in succession and the section where the cam orientation changing parts 173*b* of the second group are arranged in succession.

Figure 22B:
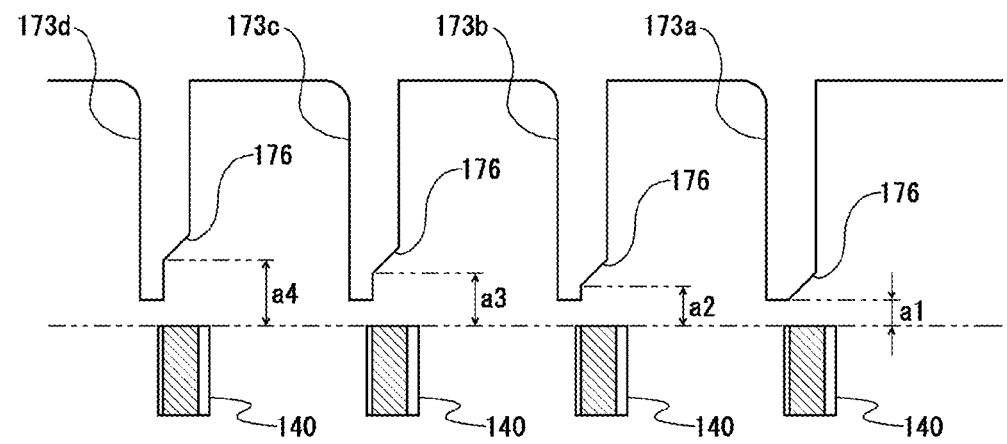
FIG. 22B is a schematic diagram illustrating the relative positions of the cam orientation changing parts with respect to the cams in yet another example of the switching member that is part of the cam clutch according to the fourth embodiment.

Moreover, the cam orientation changing parts 173 may be divided into three or more groups. For example, the cam orientation changing parts 173 may have the tapered portions 176 formed at different positions from each other as shown in FIG. 22B (which shows in in FIG. 22B the relative positions of only four cam orientation changing parts 173a to 173d with respect to the cams), and may be arranged in an alignment pattern in which the distance a1 to a4 between the tapered portion 176 and the cam increases sequentially in the other circumferential direction, for example. In such a configuration, the cam orientation changing parts may have an alignment pattern in which the distance between the tapered portion 176 and the cam varies irregularly.

In the cam clutch according to the above fourth embodiment, too, some of the cam orientation changing parts 173 have a different relative position with respect to the cams 140, so that the number of cams 140 rotated at the same timing when the operating modes of the cam clutch are switched is reduced. Therefore, the disengaging torque required for disengaging the cams 140 under a torque load can be reduced.

Embodiment 5

The cam clutch according to a fifth embodiment of the present invention has substantially the same configuration as the cam clutch 100 according to the first embodiment described above as shown in FIG. 23 except for differences in the configuration of the switching member 171 in the operating mode switch mechanism.

The switching member 171 according to this embodiment is configured to move the cam orientation changing parts 173 in a radial direction to force the cams 140 to rotate independently of the rotation of the inner race 110 and outer race 120.

Figure 24:
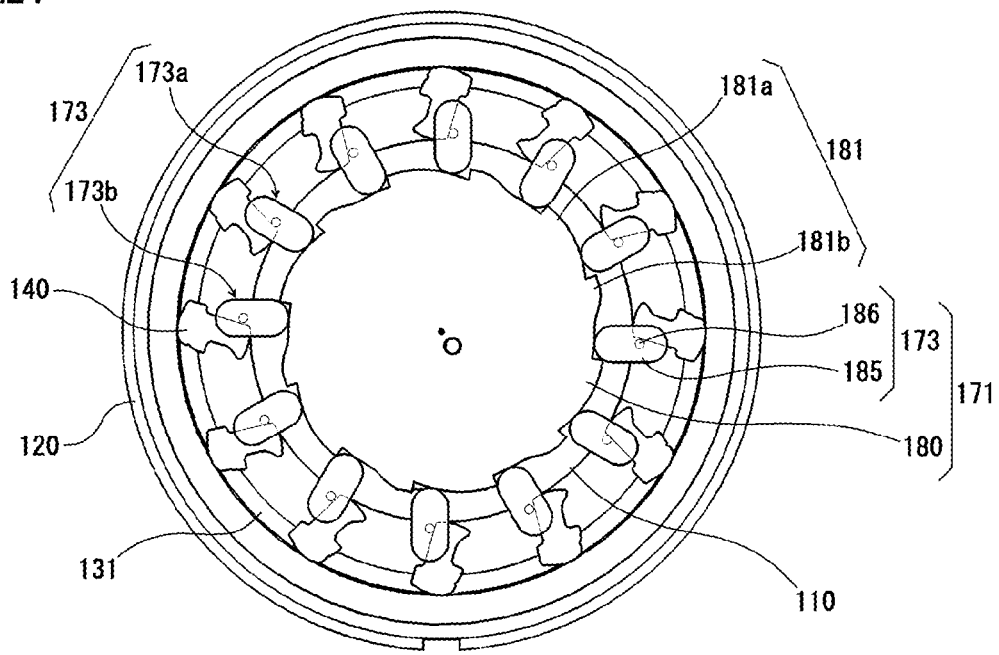
FIG. 24 is a rear view illustrating the configuration of the switching member in the cam clutch shown in FIG. 23, with the inner race, outer race, and cams.

The switching member 171 includes, as shown in FIG. 24, a plurality of cam orientation changing parts 173 each corresponding to each of the cams 140, and a control plate 180 rotatable about the rotation axis O in one direction (clockwise in FIG. 24) to move each of the cam orientation changing parts 173 in a radial direction.

The cam orientation changing part 173 is made up of a movable element 185 that has an elliptical shape in plan view, for example, and an axially extending rod-like cam pressing member 186 fixed to the movable element 185. The movable element 185 and the cam pressing member 186 may be integrally formed, or may be separate parts.

The control plate 180 has a circular disc-shaped base part, with a plurality of teeth 181 on the circumferential surface, and is designed to be rotated manually or by a suitable drive source within a predetermined angle range, to move the cam orientation changing parts 173 in the radial direction.

The teeth 181 are formed on the circumferential surface, one tooth each in each of circumferentially equally divided regions corresponding to the cam orientation changing parts 173, such that the distance from the rotation axis O to the circumferential surface increases gradually. The teeth 181 have an inclined surface, which is a circular arc surface, for example.

The cam orientation changing parts 173 are divided into two groups and the cam orientation changing parts of each of the groups have the same relative position with respect to the corresponding cams 140 so as to rotate the cams 140 at the same timing.

Figure 25:
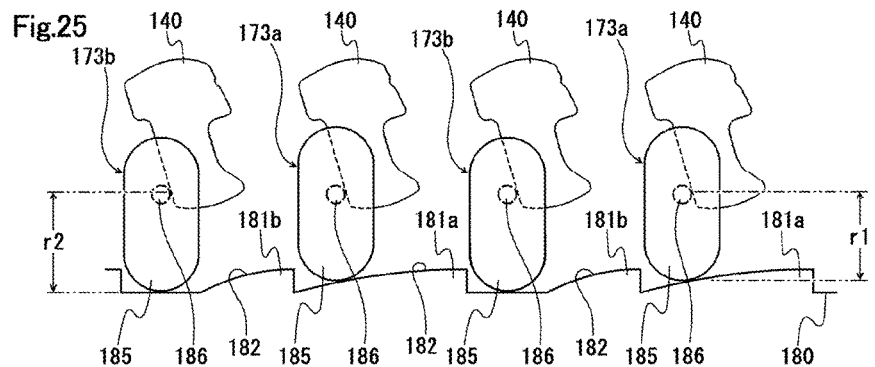
FIG. 25 is a schematic diagram illustrating the relative positions of the cam orientation changing parts with respect to the cams in the switching member shown in FIG. 24.

Specifically, as shown in FIG. 25, the teeth 181 of the control plate 180 include first teeth 181a having a circular arc inclined surface 182 with a first radius of curvature, and second teeth 181b having a circular arc inclined surface 182 with a second radius of curvature that is smaller than the first radius of curvature. The first teeth 181a and the second teeth 181b circumferentially alternate each other. The cam orientation changing parts 173 are arranged at circumferentially equal intervals, for example. The cam orientation changing parts 173a of the first group corresponding to the first teeth 181a are positioned on the inclined surfaces 182 of the first teeth 181a, while the cam orientation changing parts 173b of the second group corresponding to the second teeth 181b are positioned on the circumferential surface of the base part. The cam pressing members 186 provided to the cam orientation changing parts 173a and 173b are positioned on the same circumference.

Namely, the distance r1 between the contact point of the cam pressing member 186 of cam orientation changing parts 173a of the first group on the cam 140, and the contact point of the movable element 185 on the control plate 180, is different from the distance r2 between the contact point of the cam pressing member 186 of the cam orientation changing parts 173b of the second group on the cam 140, and the contact point of the movable element 185 on the control plate 180. Namely, when switching the operating modes of the cam clutch, the change in the cam orientation for the cams 140 is implemented at timings different between a first group and a second group of the cams. This allows for reduction of the disengaging torque as well as smooth mode switching.

In the switching member 171 according to this embodiment, the cam orientation changing parts 173 have an alignment pattern in which the cam orientation changing parts 173a of the first group and the cam orientation changing parts 173b of the second group circumferentially alternate each other, the cam orientation changing parts 173a of the first group having a first radial distance r1 between the contact point of the cam pressing member on the cam and the contact point of the movable element on the control plate, and the cam orientation changing parts 173b of the second group having a second radial distance r2.

Figure 26:
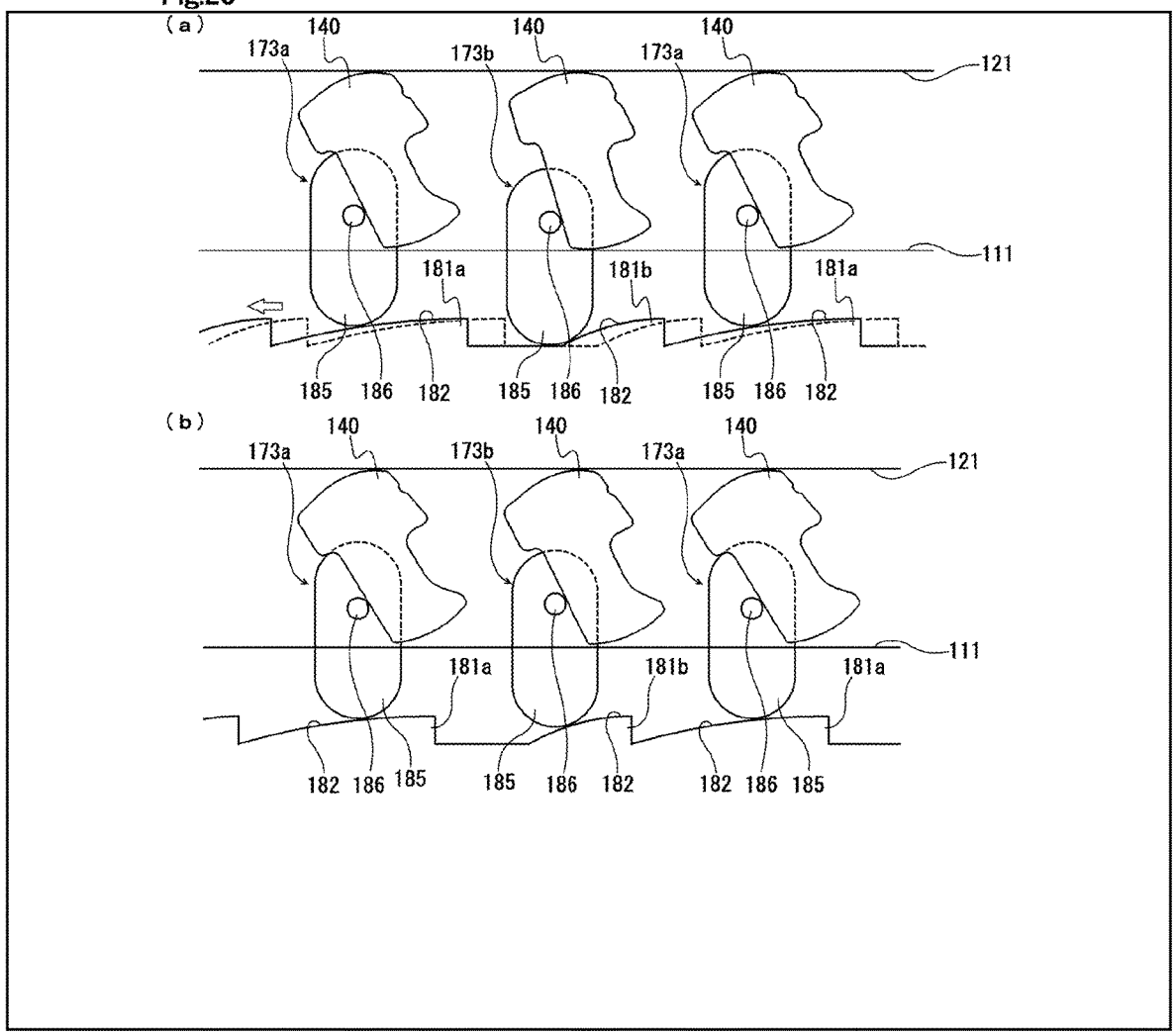
FIG. 26 is a schematic diagram for explaining the operation of the cam clutch shown in FIG. 23.

The operation of the cam clutch according to this embodiment will be described with reference to FIG. 26. For convenience of explanation, FIG. 26 illustrates the raceway 111 of the inner race 110 and the raceway 121 of the outer race 120 as parallel flat surfaces. The relative positional relationship between the cams 140 and the cam orientation changing parts 173 is illustrated in an exaggerated manner for easier understanding.

Figure 23:
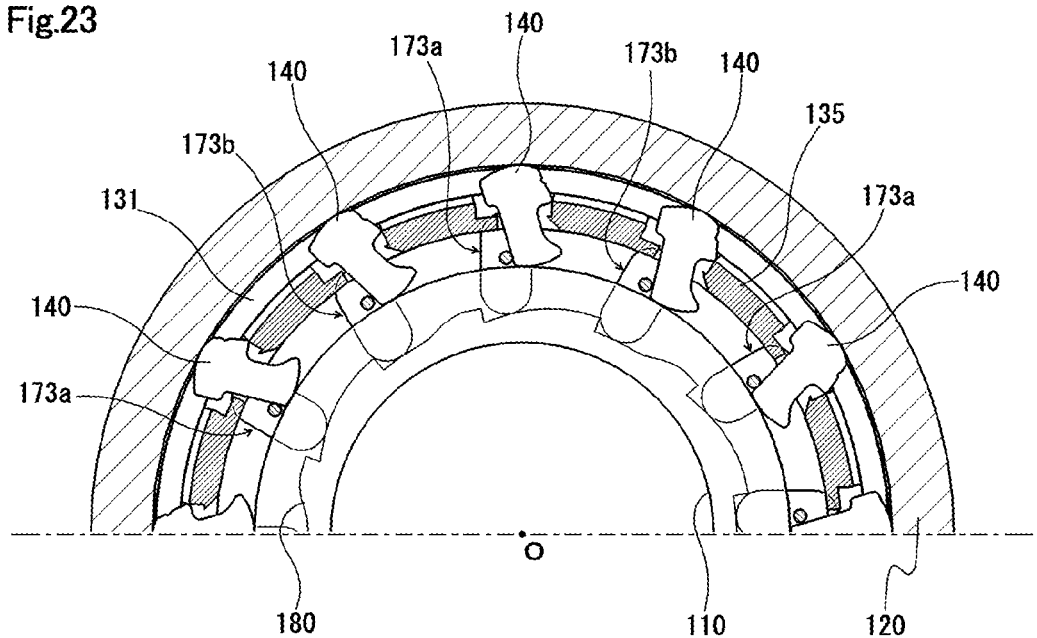
FIG. 23 is a radial partial cross-sectional view illustrating a configuration of a cam clutch according to a fifth embodiment of the present invention.

Note, first, that, when the cam orientation changing parts 173a and 173b are at positions where they do not touch the cams 140 and do not restrict the orientation of the cams 140, the cam clutch is in the one-way lock mode that prohibits rotation of the inner race 110 relative to the outer race 120 in one direction (counterclockwise in FIG. 23).

When the switching member 171 is rotated in one direction (counterclockwise in FIG. 23) manually or by a suitable drive source, the cam orientation changing parts 173a of the first group move radially outwards by the action of the inclined surface 182 of the first teeth 181a on the control plate 180, as shown in FIG. 26(a). This causes the cam pressing members 186 to press their corresponding cams 140, so that some of the cams 140 are rotated in advance to tilt in the disengaging direction.

Next, the cam orientation changing parts 173b of the second group move radially outwards by the action of the inclined surface 182 of the second teeth 181b on the control plate 180, as shown in FIG. 26(b). This causes the cam pressing members 186 to press their corresponding cams 140, so that all the other cams 140 are rotated to tilt in the disengaging direction. This restricts the orientation of all the cams 140 out of contact with the inner race 110 and outer race 120, and thus the operating mode of the cam clutch is switched from the one-way lock mode to the free mode that allows rotation of the inner race 110 relative to the outer race 120 in both directions.

In the embodiment described above, the cam orientation changing parts 173 have an alignment pattern in which the cam orientation changing parts 173a of the first group and the cam orientation changing parts 173b of the second group circumferentially alternate each other. This is not intended to limit the alignment pattern of the cam orientation changing parts 173 to a particular type.

Figure 27A:
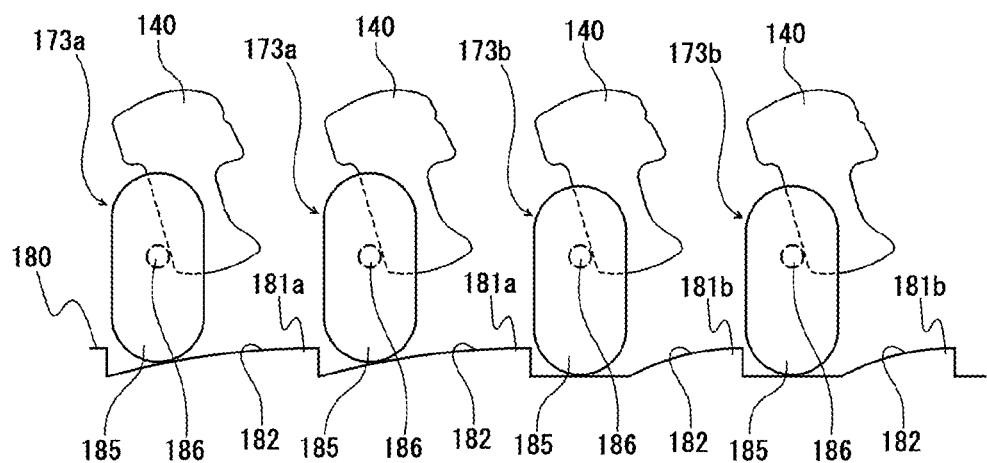
FIG. 27A is a schematic diagram illustrating the relative positions of the cam orientation changing parts with respect to the cams in another example of the switching member that is part of the cam clutch according to the fifth embodiment.

The cam orientation changing parts 173 may have an alignment pattern that includes a section where the cam orientation changing parts 173a of the first group are arranged in succession, and a section where the cam orientation changing parts 173b of the second group are arranged in succession, as shown in FIG. 27A, for example. Namely, the control plate 180 may be designed to include a section where the first teeth 181a are arranged in succession, and a section where the second teeth 181b are arranged in succession.

Moreover, the cam orientation changing parts 173 may have an alignment pattern that includes a plurality of one or more of the section where the cam orientation changing parts 173a of the first group are arranged in succession, and the section where the cam orientation changing parts 173b of the second group are arranged in succession.

Figure 27B:
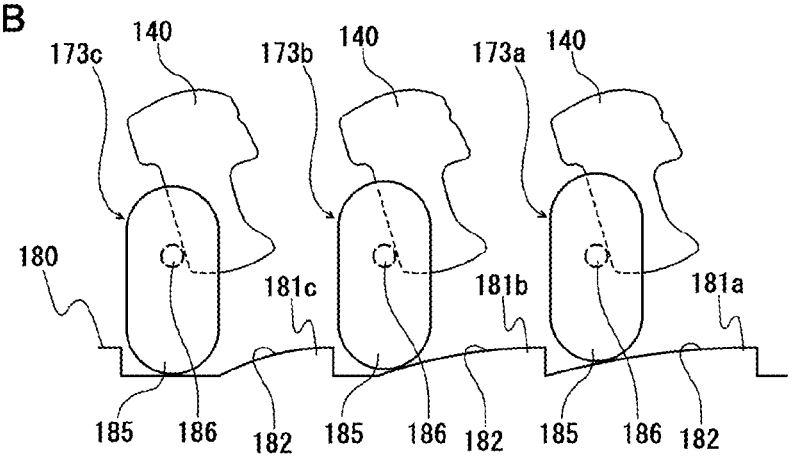
FIG. 27B is a schematic diagram illustrating the relative positions of the cam orientation changing parts with respect to the cams in yet another example of the switching member that is part of the cam clutch according to the fifth embodiment.

The cam orientation changing parts 173 may be divided into three or more groups. For example, the control plate 180 may be formed with first teeth 181a, second teeth 181b, and third teeth 181c, each having a circular arc inclined surface 182 with different radii of curvature as shown in FIG. 27B (which shows in FIG. 27B only three teeth), to cause the cams 140 to rotate group by group at different timings. In this example, the teeth are arranged in a regular pattern in which the radius of curvature of the inclined surface 182 decreases sequentially in the circumferential direction. Instead, the teeth may be arranged in a pattern in which the radius of curvature of the inclined surface varies irregularly.

Furthermore, the control plate may have multiple teeth having a circular arc inclined surface with the same radius of curvature, and the teeth may be arranged at phase positions in the rotation direction shifted from each other by a predetermined angle. This way, too, the cams 140 can be rotated group by group at different timings.

Alternatively, the teeth on the control plate may all have a circular arc inclined surface with the same radius of curvature, and the relative positions of the cams 140 with respect to the cam orientation changing parts 173 may be tailored by adjusting the positions of the cam pressing members 186 of the movable elements 185.

In the cam clutch according to the above fifth embodiment, too, some of the cam orientation changing parts 173 have a different relative position with respect to the cams 140, so that the number of cams 140 rotated at the same timing when the operating modes of the cam clutch are switched is reduced. Therefore, the disengaging torque required for disengaging the cams 140 under a torque load can be reduced.

While the inner race 110 is used as the input-side rotating member in the configurations of the cam clutches according to the first to fifth embodiments described above, the cam clutch can be designed to use the outer race 120 as the input-side rotating member.

Moreover, while all the cam clutches according to the embodiments described above are designed to use the cams configured to receive a rotational moment applied by the biasing means in the same direction, the cam clutch can be designed to use two types of cams configured to receive a rotational moment in different directions. In this case, the cam clutch can be switched between three operating modes, the two-way lock mode, one-way lock mode, and two-way free mode.

In such a configuration, the arrangement of the first-type and second-type cams is not limited to a particular layout. The first-type and second-type cams may be aligned on the same circumference, or a plurality of rows of a plurality of cams aligned on the same circumference may be arranged side by side in the axial direction.

In a configuration provided with a plurality of rows of cams, each row of cams may include only one of the first-type and second-type cams, or, may include both of the first-type and second-type cams.

The numbers of the first-type cams and second-type cams may be the same, or different.

In cases where the first-type cams and second-type cams are aligned on the same circumference, the first-type and second-type cams may be circumferentially alternately arranged, or, the first-type and second-type cams may not be alternately arranged.

Embodiment 6

Figure 28:
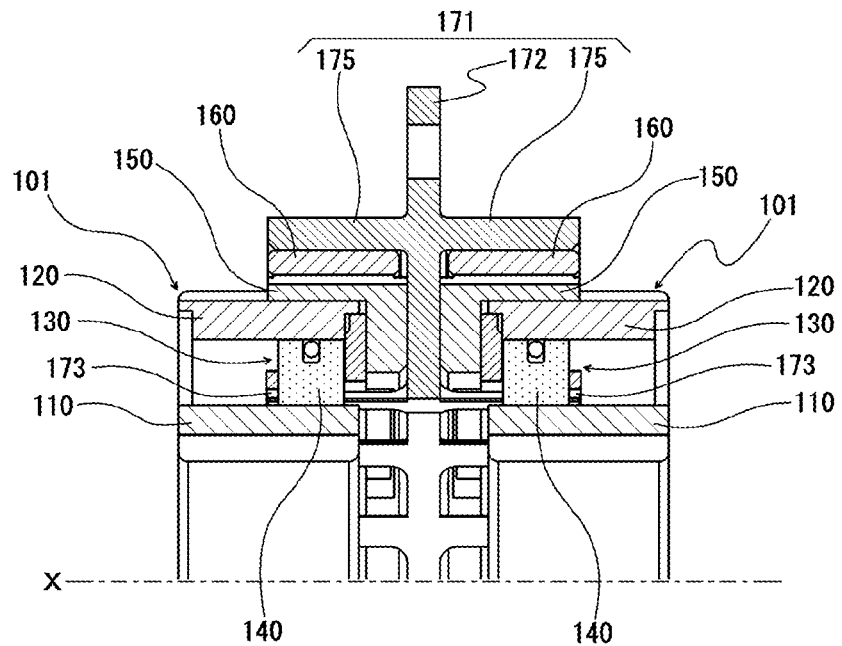
FIG. 28 is an axial partial cross-sectional view illustrating a configuration of a cam clutch according to a sixth embodiment of the present invention in a plane containing the rotation axis.

FIG. 28 is an axial partial cross-sectional view illustrating a configuration of a cam clutch according to a sixth embodiment of the present invention in a plane containing the rotation axis.

This cam clutch has clutch mechanisms 101 configured the same as the cam clutch 100 of the first embodiment arranged along the axial direction, with the end wall part 172 of the switching member 171 that is part of the operating mode switch mechanism 170 being shared in the center.

The switching member 171 includes an annular plate-like end wall part 172, a plurality of cam orientation changing parts 173 integrally formed on both sides of the end wall part 172, each corresponding to each of the plurality of cams 140, and a circumferential wall part 175 that is positioned on the same rotation axis X as that of the inner race 110 and outer race 120 and extends axially from an outer peripheral edge on both sides of the end wall part 172.

This cam clutch can be switched between four operating modes, i.e., a two-way lock mode in which the cam clutch mechanisms 101 on both sides are locked, one-way lock modes in which relative rotation is allowed in both directions for one of the cam clutch mechanisms 101 while the other cam clutch mechanism 101 is locked, and a two-way free mode in which both cam clutch mechanisms 101 are in the free state, by a circumferential movement of the cam orientation changing parts 173, which is achieved by rotating the switching member 171 manually, or by a suitable drive source.

Embodiment 7

Figure 29:
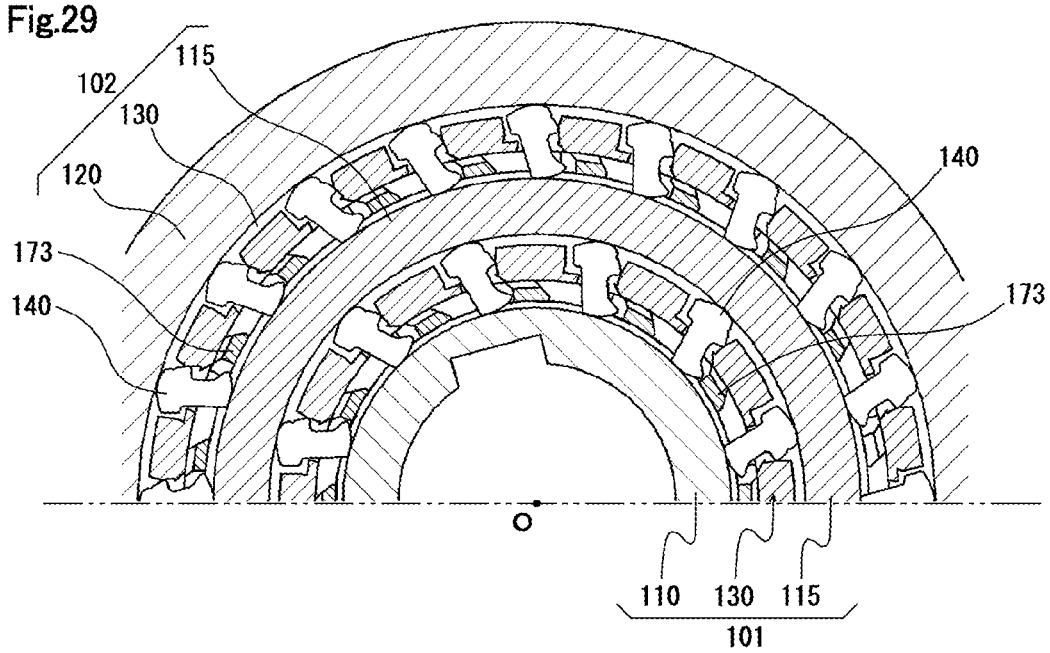
FIG. 29 is a radial partial cross-sectional view illustrating a configuration of a cam clutch according to a seventh embodiment of the present invention in a plane perpendicular to the rotation axis.

FIG. 29 is a radial cross-sectional view illustrating a configuration of a cam clutch according to a seventh embodiment of the present invention in a plane perpendicular to the rotation axis.

This cam clutch has two clutch mechanisms configured the same as the cam clutch 100 of the first embodiment in a double structure. An inner clutch mechanism 101 is arranged between the inner race 110 and an intermediate race 115, and an outer clutch mechanism 102 is arranged between the intermediate race 115 and the outer race 120, with the end wall part of the switching member that is part of the operating mode switch mechanism being shared.

The intermediate race 115 serves as the outer race in the inner clutch mechanism 101, and as the inner race in the outer clutch mechanism 102.

The switching member has a plurality of cam orientation changing parts 173, each corresponding to each of the inner and outer sets of cams 140.

In the sixth and seventh embodiments, the cam orientation changing parts of the operating mode switch mechanism may have any of the alignment patterns shown in the first to third embodiments. Two sets of cam orientation changing parts for the two clutch mechanisms may have the same alignment pattern, or different alignment patterns.

Further, the shape and structure of the switching member may be changed to cause an axial or radial movement of the cam orientation changing parts.

While embodiments of the present invention have been described in detail, the present invention is not limited to the above-described embodiments and may be carried out with various design changes without departing from the scope of the present invention set forth in the claims.

REFERENCE SIGNS LIST

100 Cam clutch
101 Clutch mechanism
102 Clutch mechanism
110 Inner race
111 Raceway
115 Intermediate race
120 Outer race
121 Raceway
125 Recessed groove
130 Cam mechanism
131 Biasing means
135 Cage ring
136a Annular plate
136b Annular plate
137 Engagement protrusion
138 Brace member
139 Garter spring mount groove
140 Cam
141 Head part
142 Radially outer engagement surface
143 Garter spring holding groove
145 Leg part
146 Radially inner engagement surface
147 Support part
150 Cage rotation stopper
151 Annular plate part
152 Engagement recess
155 Circumferential wall part
156 Engagement pawl
160 Coaxial alignment member
170 Operating mode switch mechanism
171 Switching member
172 End wall part
173 Cam orientation changing part
173a First group of cam orientation changing parts
173b Second group of cam orientation changing parts
173c to 173l Third to twelfth group of cam orientation changing parts
174 Cam pressing surface
175 Circumferential wall part
176 Tapered portion
180 Control plate
181 Teeth
181a First teeth
181b Second teeth
181c Third teeth
182 Inclined surface
185 Movable element
186 Cam pressing member
α Reference cam orientation changing part
β Cam orientation changing part on one side
γ Cam orientation changing part on the other side
L Reference line
O Rotation axis
P Pocket

The invention claimed is:

1. A cam clutch comprising:
an inner race and an outer race provided to be rotatable about a same rotation axis relative to each other;
a plurality of cams circumferentially arranged between the inner race and the outer race; and
a biasing means biasing each of the plurality of cams to make contact with the inner race and the outer race,
the cam clutch including an operating mode switch mechanism that switches operating modes of the cam clutch,
the operating mode switch mechanism including cam orientation changers that are movable to force the cams to rotate independently of rotation movement of the inner race and the outer race,
the cam orientation changers each being positioned for each of the cams,
one of the cam orientation changers has different relative position with respect to one of corresponding cams from a relative position of other cam orientation changers with respect to the other cams, so that the one of the cams is rotated at a different timing from the other cams.

2. The cam clutch according to claim 1, wherein the plurality of cams are arranged at circumferentially equal intervals.

3. The cam clutch according to claim 1, wherein the plurality of cam orientation changers are divided into a plurality of groups, the cam orientation changers of each of the groups having a same relative position with respect to cams corresponding thereto so as to rotate the corresponding cams at the same timing.

4. The cam clutch according to claim 1, wherein
the operating mode switch mechanism is configured to move the cam orientation changers in a circumferential direction,
the cam orientation changers have an alignment pattern designed to include a section where one cam orientation changer has a different position angle relative to a reference line from a position angle of another cam orientation changer, with the reference line being a line that connects a position of one cam orientation changer, which is regarded as a reference cam orientation changer, and the rotation axis, and with the one cam orientation changer being the cam orientation changer that is adjacent the reference cam orientation changer on one circumferential side, and moreover with the other cam orientation changer being the cam orientation changer that is adjacent the reference cam orientation changer on another circumferential side.

5. The cam clutch according to claim 4, wherein the alignment pattern of the cam orientation changers includes a first section where one of two adjacent cam orientation changers has a first position angle ($\theta 1$) relative to the other and a second section where one of two adjacent cam orientation changers has a second angle (θ2) relative to the other, and these sections alternate each other.

6. The cam clutch according to claim 4, wherein the alignment pattern of the cam orientation changers includes a first section where part of the cam orientation changers are arranged at a first position angle (θ1) in succession, and a second section where all the other cam orientation changers are arranged at a second angle (θ2) in succession.

7. The cam clutch according to claim 4, wherein the alignment pattern of the cam orientation changers is designed such that each of the cam orientation changers has the position angle that is different from the position angle of a cam orientation changer adjacent thereto.

8. The cam clutch according to claim 1, wherein
the operating mode switch mechanism is configured to move the plurality of cam orientation changers in an axial direction,
the plurality of cam orientation changers each have a tapered portion having a tapered shape at a distal end on one side that faces a corresponding cam and decreases in width frontward in a moving direction of the switching member, and
the plurality of cam orientation changers have an alignment pattern designed to include a section where two adjacent cam orientation changers have different axial distances from cams corresponding thereto.

9. The cam clutch according to claim 8, wherein the alignment pattern of the cam orientation changers is designed such that cam orientation changers of a first group having a first axial distance from cams corresponding thereto and cam orientation changers of a second group having a second axial distance from cams corresponding thereto alternate each other.

10. The cam clutch according to claim 8, wherein the alignment pattern of the cam orientation changers is designed to include a section where cam orientation changers of a first group having a first axial distance from cams corresponding thereto are arranged in succession, and a section where cam orientation changers of a second group having a second axial distance from cams corresponding thereto are arranged in succession.

11. The cam clutch according to claim 8, wherein the alignment pattern of the plurality of cam orientation changers is designed such that the cam orientation changers have different axial distances from cams corresponding thereto.

12. The cam clutch according to claim 1, wherein
the operating mode switch mechanism is configured to move the cam orientation changers in a radial direction,
the operating mode switch mechanism includes a control plate that is rotatable and formed with a plurality of teeth on a circumferential surface of a circular plate-like base part, each of the plurality of teeth being formed to gradually increase in distance from a rotation axis to the circumferential surface,
the plurality of cam orientation changers each comprise a movable element that is radially moved by rotation of the control plate, and an axially extending cam pressing member fixed to the movable element, and
the plurality of cam orientation changers have an alignment pattern designed to include a section where two adjacent cam orientation changers have different radial distances between a contact point between the cam pressing member and a cam corresponding thereto, and a contact point between the movable element and the control plate.

13. The cam clutch according to claim 12, wherein the alignment pattern of the plurality of cam orientation changers is designed such that cam orientation changers of a first group and cam orientation changers of a second group alternate each other, the first group having a first radial distance and the second group having a second radial distance, the first and second radial distances each being a radial distance between a contact point between the cam pressing member and a cam corresponding thereto, and a contact point between the movable element and the control plate.

14. The cam clutch according to claim 12, wherein the alignment pattern of the plurality of cam orientation changers is designed to include a section where cam orientation changers of a first group are arranged in succession, and a section where cam orientation changers of a second group are arranged in succession, the first group having a first radial distance and the second group having a second radial distance, the first and second radial distances each being a radial distance between a contact point between the cam pressing member and a corresponding cam, and a contact point between the movable element and the control plate.

15. The cam clutch according to claim 12, wherein the alignment pattern of the plurality of cam orientation changers is designed such that the cam orientation changers have different radial distances between a contact point between the cam pressing member and a cam corresponding thereto, and a contact point between the movable element and the control plate.

16. The cam clutch according to claim 12, wherein the cams include first cams and second cams, the first cams and the second cams engaging with the inner race and outer race in different directions.

* * * * *